(12) United States Patent
Fischer et al.

(10) Patent No.: US 10,009,337 B1
(45) Date of Patent: Jun. 26, 2018

(54) CHILD TENANT REVOCATION IN A MULTIPLE TENANT ENVIRONMENT

(71) Applicant: EMC Corporation, Hopkinton, MA (US)

(72) Inventors: Ilia Fischer, Milton (CA); Michal J. Drozd, Cracow (PL); Aliaksandr Shtop, Oakville (CA); Vitaly Morozov, Irvine, CA (US); Michael G. Roche, Hamilton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 150 days.

(21) Appl. No.: 14/788,323

(22) Filed: Jun. 30, 2015

(51) Int. Cl.
*H04L 29/06* (2006.01)
*H04L 29/08* (2006.01)

(52) U.S. Cl.
CPC .......... *H04L 63/083* (2013.01); *H04L 63/105* (2013.01); *H04L 67/306* (2013.01)

(58) Field of Classification Search
CPC .... H04L 63/083; H04L 63/105; H04L 67/306
See application file for complete search history.

(56) References Cited

U.S. PATENT DOCUMENTS

| | | | |
|---|---|---|---|
| 7,010,600 B1 | 3/2006 | Prasad et al. | |
| 7,730,523 B1 | 6/2010 | Masurkar | |
| 8,291,490 B1 * | 10/2012 | Ahmed | G06F 21/604 726/17 |
| 9,203,829 B1 | 12/2015 | Levine et al. | |
| 9,734,156 B1 | 8/2017 | Bajpai et al. | |
| 2007/0033148 A1 | 2/2007 | Cahill | |
| 2009/0006851 A1 | 1/2009 | Freeman et al. | |
| 2010/0020766 A1 * | 1/2010 | Kang | H04W 48/02 370/331 |
| 2011/0167256 A1 | 7/2011 | Lee et al. | |
| 2012/0072716 A1 | 3/2012 | Hu et al. | |
| 2012/0233472 A1 | 9/2012 | Faraboschi et al. | |
| 2016/0337365 A1 * | 11/2016 | Beiter | G06F 9/468 |

* cited by examiner

*Primary Examiner* — Meng Li
(74) *Attorney, Agent, or Firm* — Womble Bond Dickinson (US) LLP

(57) ABSTRACT

A first request is received from a first user to revoke an access right of a second user of a first tenant for accessing data of a second tenant, where the first tenant is a parent tenant of the second tenant. In one embodiment, in response to the first request, a first role of the first user within the second tenant and a second role of the first user within the first tenant are determined. A first and second access privileges of the first role and second role of the first user, respectively, are determined to allow the first user to revoke the access right to the second tenant. In response to the first user having a revoke privilege in the first and second tenant, the first user is allowed to remove the second tenant from the first tenant.

21 Claims, 20 Drawing Sheets

| ACE # | Resource ID | Tenant ID(s) | Role ID(s) | Privilege ID(s) |
|---|---|---|---|---|
| 1 | ABC | Tenant C | Operator | VIEW_EMAIL |
| 2 | ABC | Tenant B, Tenant C | Email Admin | VIEW_EMAIL, DELETE_EMAIL |
| ... | ... | ... | ... | ... |

ACL DB 150

FIG. 3

| Tenant ID | Key # |
|---|---|
| Tenant 1 (e.g., Tenant C) | Key 1 |
| Tenant 2 (e.g., Tenant B) | Key 2 |
| Tenant 3 (e.g., TenantB@HR) | Key 3 |
| . . . | . . . |
| . . . | . . . |

Key Store
475

FIG. 17

CHILD TENANT REVOCATION IN A MULTIPLE TENANT ENVIRONMENT

RELATED APPLICATIONS

This application is related to co-pending U.S. patent application Ser. No. 14/788,281, entitled "Principal/User Operation in the Context of a Tenant Infrastructure," filed Jun. 30, 2015 and U.S. patent application Ser. No. 14/788,362, entitled "SAML Representation for Multi-Tenancy Environments," filed Jun. 30, 2015. The disclosure of the above applications is incorporated by reference herein in its entirety.

FIELD OF THE INVENTION

Embodiments of the present invention relate generally to data storage systems. More particularly, embodiments of the invention relate to authentication, authorization, and managing access control of users in a multi-tenant environment.

BACKGROUND

A multi-tenant environment refers to a technology wherein a single storage system is deployed to serve multiple customers, each customer using the same storage system for their protection storage requirements. A storage system, which supports multi-tenants, must satisfy the security and isolation requirements. Here, the "security and isolation requirements" refer to the requirements that each customer's dataset must be secured and isolated from the other customers on the storage component. The security and isolation requirements apply to the authentication and authorization of customers that request data access. For example, a customer (e.g., a tenant) must not be able to enter another customer's data sets, or read or write to data sets that belong to another customer. The security and isolation requirements can also refer to managing access control. For example, an administrator of one customer must not be able to perform system configuration, monitoring, etc., of the datasets that belong to another customer. Thus, although the customers may share the same storage system for authenticating, authorizing, backing up, restoring, or replicating their datasets, none of the customers can be aware of the presence of other customers in the storage system.

Other than the security and isolation requirements, there were some other obvious problems in deploying multi-tenants within a single storage system. For example, a conventional multi-tenant system does not include an authentication and authorization component, in which a principal (e.g., a user with administrative roles/privileges) could log in to one customer, obtain multiple roles associated with that one customer, and be authorized to use the multiple roles within that one customer, while the principal is also associated with additional roles for other customers which are not authorized within that one customer. Deploying multi-tenants on a conventional multi-tenant system, especially in regards to a service provider dealing with a customer's revocation or reorganization request, also presents a problem of administrative scaling and authorization. For example, if tens or hundreds of customers are deployed in the same conventional multi-tenant system, and if none of these customers' own administrators could perform self-administration of a revocation or reorganization request, then for each and every revocation and reorganization request, the customers would be dependent on the system administrator. Thus, the system administrator would face a problem as the number of customers increase, and each customer would face a problem when it needs to revoke data access to another customer.

In addition, as the storage system industry experiences a paradigm shift towards Software Defined Storage (SDS), Software Defined Data Center (SDDC), Software Defined Infrastructure (SDI) etc., the security authentication and authorization considerations for operations on storage systems have changed. Storage systems are now Cloud enabled, and are ready to be deployed in use cases that enable the storage systems to be used in "as a service" models. The problems and challenges faced with regards to security authentication and authorization for operations performed on storage system resources being exposed in this new and evolving paradigm are different. Conventional mechanisms are no longer sufficient to satisfy the security authentication and authorization concerns of such environments, especially in a multi-tenant environment.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating an example of an access control list database according to one embodiment of the invention.

FIG. 17 is a block diagram illustrating a key store according to one embodiment of the invention.

DETAILED DESCRIPTION

Figure 1:
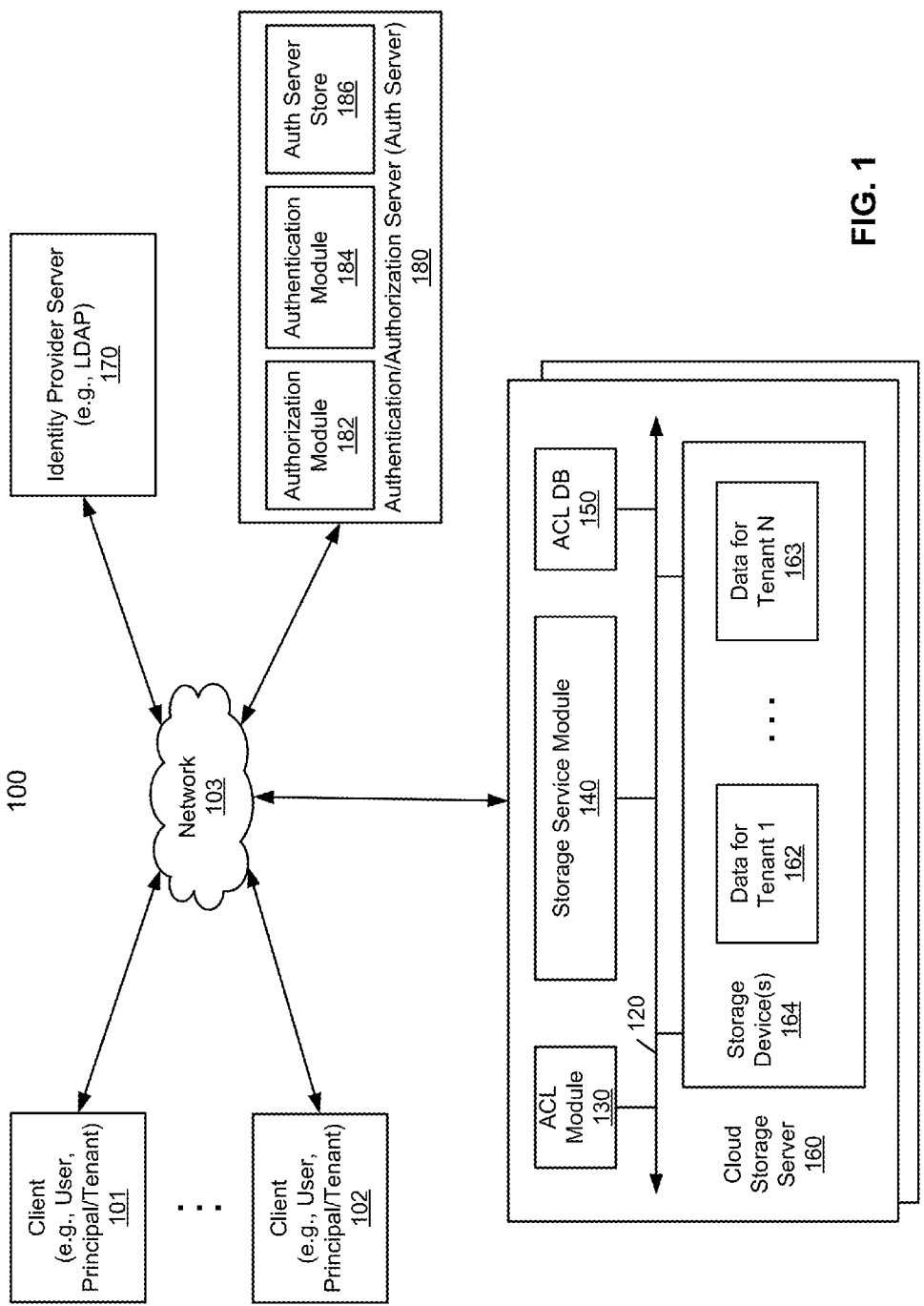
FIG. 1 is a block diagram illustrating an authentication/authorization system in a multi-tenant environment according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Bracketed text and blocks with dashed borders (e.g., large dashes, small dashes, dotdash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the present invention address authenticating and authorizing users, and managing access control of users in a multi-tenant environment. According to some embodiments, an authentication and authorization server (also referred to as an auth server) is utilized to authenticate and authorize users (also referred to as principals) who may have different roles in different tenants of the same organization entity or different organization entities. According to one aspect of the invention, in response to a request received from a client device (e.g., a cloud storage system) for authenticating and authorizing a user, the auth server authenticates the user based on user credential such as a username and password of the user. The auth server also identifies a list of one or more tenants of which the user is a member. For each of the identified tenants, user's role or roles are identified and for each of the roles, one or more access privileges of the role are also identified. An auth token is then generated having information indicating the tenants, roles of each tenant, and privileges of each role for the user. The auth token is returned to the client device to allow the client device to determine whether the user is allowed to access a particular resource associated with the client device.

According to another aspect of the invention, a mechanism is provided to allow a user to revoke an access right to a child tenant from a parent tenant in a multi-tenant environment. In one embodiment, a first request is received at an auth server from a first user to revoke an access right of a second user of a first tenant for accessing data of a second tenant, where the first tenant is a parent tenant of the second tenant. In response, the auth server determines a first role of the first user within the second tenant. The auth server further determines whether an access privilege of the first role of the first user allows the first user to revoke the access right to the second tenant. In response to the first user having a revoke privilege, the auth server allows the first user to remove the second tenant from the first tenant. The auth server also allows a user to realign a child tenant from dependent from one parent tenant to another parent tenant.

According to a further aspect of the invention, a security mechanism is in place to allow an auth token to encrypt various information using different encryption keys, such that only proper recipients of the auth token can decrypt the corresponding information in determining whether a particular user can access a resource of a particular tenant. According to one embodiment, in response to a request for authenticating and authorizing a user received from a client device, an auth server authenticates the user based on user login credentials, such as a username and a password. Upon having successfully authenticated the user, the auth server identifies a list of tenants of which the user is a member and one or more roles within each of the tenants. The auth server generates an auth token (also referred to as an authorization token) having information identifying the tenants and their respective roles of the user. The information associated with each tenant is encrypted using an encryption key that is specifically associated with the tenant. The auth token is then transmitted to the client device to allow the client device to determine whether the user is entitled to access a requested resource based on the auth token.

FIG. 1 is a block diagram illustrating an authentication/authorization system in a multi-tenant environment according to one embodiment of the invention. As used herein, a "tenant" refers to the highest unit of abstraction for providing security and logical separation or isolation in a multi-tenant storage system. A tenant also acts as the highest abstraction for allocating and tracking resource utilization by the tenant. As used herein, a "resource" may refer to data such as a file, an object, a workflow, or a directory of one or more files, objects, etc. Alternatively, a resource can refer to a service (e.g., software as a service, storage as a service) provided by a server or a cluster of one or more servers associated with a service provider. As used herein, a tenant can be a business unit or a group of one or more users (e.g., a human resource department, a finance department, an information technology department, etc.) within an enterprise or corporation (e.g., Tenant A, Tenant B, Tenant C, etc.). A tenant can also refer to an enterprise (e.g., when a storage system/appliance is deployed by a service provider). Note that these tenants may also have parent and/or child tenants, which create/define "tree" hierarchies for the tenants in the multi-tenant environment.

Referring to FIG. 1, system 100 includes, but is not limited to, one or more client systems 101-102 communicatively coupled to cloud storage server 160, identity provider server 170, and auth server 180 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. As used herein, a client may also refer to a user/principal, a principal tenant, a child tenant, and/or a component in a multi-tenant environment. Alternatively, any of clients 101-102 may be a primary storage system (e.g., local data center) that provides storage to other local clients, which may periodically back up the content stored therein to a backup storage system (e.g., a disaster recovery site or system), such as cloud storage system 160. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Cloud storage system 160 may be located in proximity to one, both, or neither of clients 101-102.

Cloud storage server 160 may be a storage system that includes or represents any type of servers or a cluster of one or more servers (e.g., cloud servers). For example, cloud storage server 160 may be a storage server used for various different purposes, such as to provide multiple users or client systems with access to shared data and/or to back up (or restore) data (e.g., mission critical data). Cloud storage server 160 may provide storage services to clients or users via a variety of access interfaces and/or protocols such as file-based access protocols and block-based access protocols. Cloud storage server 160 may be, for example, a file server (e.g., an appliance used to provide network attached storage (NAS) capability), a block-based storage server (e.g., used to provide a storage area network (SAN) capability), a unified storage device (e.g., one which combines NAS and SAN capabilities), a nearline storage device, a direct attached storage (DAS) device, a tape backup device, or essentially any other type of data storage device. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc.

Cloud storage server 160 may further provide storage services via an object-based protocol and Hadoop distributed file system (HDFS) protocol. Cloud storage server 160 may have a distributed architecture, or all of its components may be integrated into a single unit. Cloud storage server 160 may be implemented as part of an archive and/or backup system such as a deduplicating storage system available from EMC® Corporation of Hopkinton, Mass.

In one embodiment, cloud storage server 160 further includes a storage manager or storage controller (not shown) configured to manage storage resources of cloud storage server 160, such as, for example, storage space and processing resources (e.g., processor, memory, network resources). The storage manager or controller may be accessed by a user/principal of the cloud storage server 160 remotely via a management or configuration interface or management server or portal (not shown). The user/principal may create, revoke, realign, and/or manage storage resources based on component agreements derived from a set of tenants, roles, and/or privileges. The storage resources of cloud storage server(s) 160 may be virtualized into a pool of virtual storage resources, where underlying physical storage resources represented by the corresponding virtual storage resources may be implemented locally, remotely (e.g., hosted by another storage system), or both.

The virtual storage resources can be provisioned, allocated, and/or defined by a user/principal or by a service provider based on a set of software-defined tenants, roles and privileges. The virtual storage resources may be represented in one or more virtual machines (e.g., virtual storage systems) managed by one or more virtual machine managers (VMMs). Each of the virtual machines can be provisioned to provide a particular type of storage services (e.g., resource-based, file-based, block-based, object-based, HDFS, etc.) to a client based on a cloud storage server level agreement associated with that particular client as part of software-defined storage services (e.g., authentication/authorization services, tenant services, resource services, etc.).

In one embodiment, cloud storage server 160 includes, but is not limited to, storage service module 140 (also referred to as service logic, service engine, or service unit, which may be implemented in software, hardware, or a combination thereof), access control list (ACL) module 130, ACL database 150, and one or more storage devices 164 storing data associated with one or more tenants 162-163, where these components are communicatively coupled to each other via interconnect 120, which may be a bus and/or a network. Storage service module 140 may represent any storage service related to components configured or adapted to provide storage services (e.g., storage as a service) to a variety of clients using any of the access protocols set forth above. For example, storage service module may include backup logic (not shown) configured to receive and back up data from client (e.g., clients 101-102) and to store the backup data in any of the storage devices 164 associated with one or more tenants 162-163. In the illustrated example, storage service module may further include restore logic (not shown) configured to retrieve and restore backup data from any one or more tenants 162-163 back to a client (e.g., clients 101-102). Storage devices 164 storing data for tenants 162-163 may be persistent storage devices, such as, for example, hard disks, an array of disks, and/or storage appliances.

ACL module 130 may represent any access control service related to multiple access control lists configured or modified to provide a secured access control service to a variety of clients within a multi-tenant environment. ACL module 130 may be loaded into memory such as a random access memory (RAM) and executed by one or more processors (e.g., general-purpose processors such as central processing units or CPUs, or special-purpose processors). ACL DB 150 may include, but is not limited to, one or more access control entries (ACE) associated with one or more tenants (e.g., tenants 162-163). ACL DB 150 may also be stored in a persistent storage device 164 and when being accessed, loaded into the memory and executed by the processor(s).

ACL DB 150 may represent multiple access control lists that are attributes of a file or directory that control which users (e.g., clients 101-102) on a file storage (e.g., storage 164) can access the file or directory. Different types of access are defined, typically read, write, and/or execute. A single ACE includes, but is not limited to, a resource ID, a tenant ID, a role ID, and a privilege ID. Further, an ACE specifies either allow or deny, the type of access (e.g., read/write), and the user or user group the access refers to. An example of ACL DB 150 is shown in FIG. 3, which will be described in details further below. Typically, an ACL contains all deny access entries followed by all allow access entries, or vice-versa. The ACL entries are evaluated by ACL module 130 to determine if a user is allowed access to a file belonging to a tenant (or child-tenants of the tenant). ACLs can be from several hundred bytes to hundreds of kilobytes.

ACLs may be stored in an ACL database 150 that contains ACL data that refers to permission attributes associated with a file or directory of one or more files. Most operating systems, such as Windows, network file system (NFS), or UNIX, store ACL data along with the content data. For example, when a file is requested, the ACL data may also be embedded within the requested file along with the associated files or directories. In one embodiment, an ACE (i.e., stored in the ACL database 150 and/or auth server 180) may include, but is not limited to, a permission mask (e.g., read, write, delete, create, administer, etc.), and a role assignment SIDR (also referred to as a unique secured identity role), which includes information identifying a particular tenant and role.

In one embodiment, ACLs are located in components that are performing access control to resources and/or tenants. Further, each ACE includes a "known" privilege that is required to access a resource, and a reference to a tenant in which this "known" privilege is applicable to access the resource. As used herein, a "known" privilege refers to a type of access such as read, write, delete, create, and/or administer that have been predefined according to a specification or protocol of a file system or storage system. Each resource may be associated with one or more ACEs/ACLs. For example, a first ACE provides that an email resource can be read by users with a "read email" privilege at Tenant A, while a second ACE provides that the email resource can be read by users with an "email administration" privilege at Tenant B. By way of example, in order to determine whether to allow or deny a user access to the email resource, a component compares the ACE/ACL of the email resource against an auth token, which is associated with the requesting user and generated by an authorization server. As used herein, a "component" refers to a single unit within a multi-tenant environment. A component may be, but is not limited to, any type of component such as a server (e.g., a NFS server, a Server Message Block (SMB) server, a Protection Point Server, DDBoost), a child/parent tenant server, a product server, a client server, and/or a user interface, or any combination thereof.

Further, the auth token includes, but is not limited to, each role the requesting user is authorized to use within the tenant that the user logged in to (described in further detail below). Continuing on with the above example, the component will allow the user access to the email resource if the auth token includes a role within the requested tenant (e.g., the tenant the user is logged in to) that matches the identified role and tenant from the ACE/ACL of the email resource and/or the role's privileges include privilege to access emails. If not, the component will deny the user from accessing the email resource.

In the illustrated example, cloud storage server 160 includes storage device(s) 164 associated with tenant 162 and tenant 163. Data of tenants 162-163 may be stored in the same storage device or different storage devices dependent upon specific configurations. Each tenant may be allocated with a specific amount of storage space or alternatively, the storage space may be allocated on a subscription basis according to a service level agreement (e.g., storage as a service).

In one embodiment, a user (e.g., clients 101-102) may access data stored in storage device(s) 164 through tenants 1 and N using various protocols. For example, tenants 1 and N may need to be authenticated and authorized using Auth Server Client protocol (available from EMC® Corporation of Hopkinton, Mass.) before accessing the data associated with the respective tenants. Further, users associated with tenants 1 and N can access data stored in storage device(s) 164 using: (1) DDBoost protocol (available from EMC® Corporation of Hopkinton, Mass.), in which case file storages 164 are known as storage units; (2) NFS or CIFS protocol, in which case file storages 164 are known as VTL pools; or (3) Protection Point protocol, in which case file storages 164 are known as Vdisks. Various other protocols can be used without departing from the broader scope and spirit of the present invention.

Further, by using the access protocols, cloud storage server 160 enables tenants 1 and N to have their own respective tenant principals, and thus, do not rely on a system admin/provider (not shown). A principal may operate within a tenant, which is not the tenant the principal belongs to. As used herein, a "principal" may refer to a user, a tenant, a parent/child tenant, a service provider, and/or a client. Further, a principal is associated with, but not limited to, a set of privileges and a set of roles used to access one or more tenants. A principal may also have multiple roles within multiple tenants (described further below). Various mechanisms of the present invention shall become apparent through the description of other figures below.

Storage device(s) 164 may be implemented locally (e.g., single node operating environment) or remotely (e.g., multi-node operating environment) via interconnect 120, which may be a bus and/or a network (e.g., a storage network or a network similar to network 103). Storage device(s) 164 may include a single storage device such as a hard disk, a tape drive, a semiconductor memory, conventional magnetic disks, optical disks such as CD-ROM or DVD based storage, magnetic tape storage, magnetic-optical (MO) storage media, solid state disks, flash memory based devices, multiple storage devices such as a redundant array system (e.g., a redundant array of independent disks (RAID)), a system for storage such as a library system or network attached storage system, or any other type of non-volatile storage devices or systems suitable for storing large volumes of data. Storage device(s) 164 may store one or more data files or segments of files (also referred to as resources, workflow, data objects, objects) to be accessed by one or more authenticated/authorized users.

In one embodiment, segments of data files are stored in a deduplicated manner, either within each of Storage device 164 or across at least some of Storage devices 164. In one embodiment, storage service module 140 further includes or is associated with a deduplication logic (not shown) configured to segment data files into segments, to deduplicate the segments into deduplicated segments, and to store the deduplicated segments in storage device(s) 164. Data stored in storage device(s) 164 may be stored in a compressed form (e.g., lossless compression: Huffman coding, Lempel-Ziv Welch coding; delta encoding: a reference to a chunk plus a difference, etc.). In one embodiment, different storage devices may use different compression methods (e.g., main or active file storages from other file storages, one file storage from another file storage, etc.). The metadata (not shown) may be stored in at least some of storage device(s)

164, such that files can be accessed independent of another file storage. Metadata of each file storage includes enough information to provide access to the files it contains.

Identity provider server 170 may include or represent any type of servers or a cluster of one or more servers (e.g., cloud servers). For example, identity provider server 170 may be an Active Directory or a lightweight directory access protocol (LDAP) deployed in a multi-tenant environment. Typically, identity provider server 170, for example, may be used to create fully customized and operational identity directory services that provide the client with principal identities (i.e., users who access a particular file) and policies for the ACL assignments in the multi-tenant environment. Identity providers may include one or more user account stores defined in a local database (e.g., auth server 180) or a leveraging external service (e.g. AD, LDAP, etc.). Each identity provider may be associated with one or more tenants and users. In one embodiment, an identity provider (e.g., identity provider server 170) is used to authenticate users that are requesting access to one or more tenants in the multi-tenant environment. Identity providers may organize user accounts in to a user group, such that the user accounts may belong to one or more user groups. A user group may also be organized/nested in to other user groups. Each identity provider (e.g., identity provider server 170) may be associated with one or more tenants in an authentication/authorization server (e.g., auth server 180) to grant the users/principals access to resources associated with one or more tenants.

Auth server 180 may include any type of servers or cluster of servers used for authenticating, authorizing, and managing access control of users in a multi-tenant environment. As used herein, "auth" refers to a system/unit, which can be used to authenticate and authorize users within a multi-tenant environment. Contrary to a conventional multi-tenant authorization system, auth server 180 of embodiments of the present invention allows principals (e.g., clients 101-102) to be associated with one or more roles within one or more authorized tenants (e.g., tenants 162-163). For example, while a principal/user may be authorized to perform a set of roles within a first tenant, the principal/user may only be authorized to perform in a capacity of a particular role and/or a subset of the set of roles within a second tenant. Auth server 180 provides an authentication and authorization protocol to external principals (e.g., end users, clients) and/or internal components (e.g., multi-tenant data protection system components, user interface components, etc.). Auth server 180 may have a distributed architecture, or all of its components may be integrated into a single unit. In one embodiment, auth server 180 may be implemented locally (e.g., single node operating environment) or remotely (e.g., multi-node operating environment) via a bus and/or a network.

In one embodiment, through configuration interface associated with auth server 180 and/or cloud storage server 160, a user or administrator can configure a set of tenants, roles, and privileges for a principal to access one or more Resource Based Access Control (RBAC) components (also referred to as Role Based Access Control components) (not shown). In one embodiment, a user or administrator with proper privileges can configure cloud storage server(s) 160 and auth server 180 via a centralized management server or portal (not shown), where the configuration data is pushed from the management server or portal to cloud storage server(s) 160 and auth server 180 over a network. For example, RBAC is configured to use the metadata from ACL database 150 to determine whether tenants (e.g., tenants 162-163) may perform control access of one or more resources stored in file storages (e.g., storages 164). Auth server 180 is configured to provide client identity sources to various components (e.g., web user interface components) in a multi-tenant environment. Auth server 180 is configured to use these identity sources to allow the components to implement their own RBAC components. For example, when users (e.g., clients 101-102) require an access to a client/component resource (e.g., storages 164), an access request is forwarded to auth server 180. In response to the requests, auth server 180 is responsible for authenticating, authorizing, and managing access control to the client/component resources (e.g., storages 164) by enabling components (e.g., tenants 162-163) to verify the users requests based on the auth server authentication and authorization protocol (described further below). Continuing on with the above example, auth server 180, however, does not perform RBAC for any of the components in the multi-tenant environment. In an alternative embodiment, auth server 180 may be configured to perform RBAC at the request of a client.

In one embodiment, auth server 180 includes, but is not limited to, authorization module 182, authentication module 184, and auth server store 186. Authorization module 182 may represent an authorization service related-component configured or adapted to provide authorization services (e.g., authorization as a service) to a variety of clients/tenants using any of the access protocols set forth above and through the discussion of the other figures below. For example, authorization module 182 is configured to isolate and secure components' access to resources by associating users with one or more privileges within one or more authorized tenants (i.e., roles). Authorization module 182 is configured to receive and authorize a user request from a client (e.g., clients 101-102) to access one or more resources of the client.

Authentication module 184 is configured to receive and verify information from a client (e.g., clients 101-102) and to identify the client information in any one or more identity provider components (e.g., identity provider server 170). Authentication module 184 may represent an authentication service related-component configured or adapted to provide authentication services (e.g., authentication as a service) to a variety of clients/tenants using any of the access protocols set forth above and through the discussion of the other figures below. For example, authentication module 184 is configured to identify clients using information including, but not limited to, a user name, a password, a tenant name, and/or a domain name. Auth server store 186 may include, but not limited to, user objects, user group objects, identity source objects, domain objects, tenant objects, role objects, token objects, and/or privilege resources (described in further detail below). The configuration shown in FIG. 1 shall be referenced throughout the description. Throughout the description, references are made to IDs for users, tenants, roles, resources, identity sources/providers, tokens, domains, and privileges. It shall be understood that these IDs may be Universally Unique IDs (UUIDs).

Figure 2:
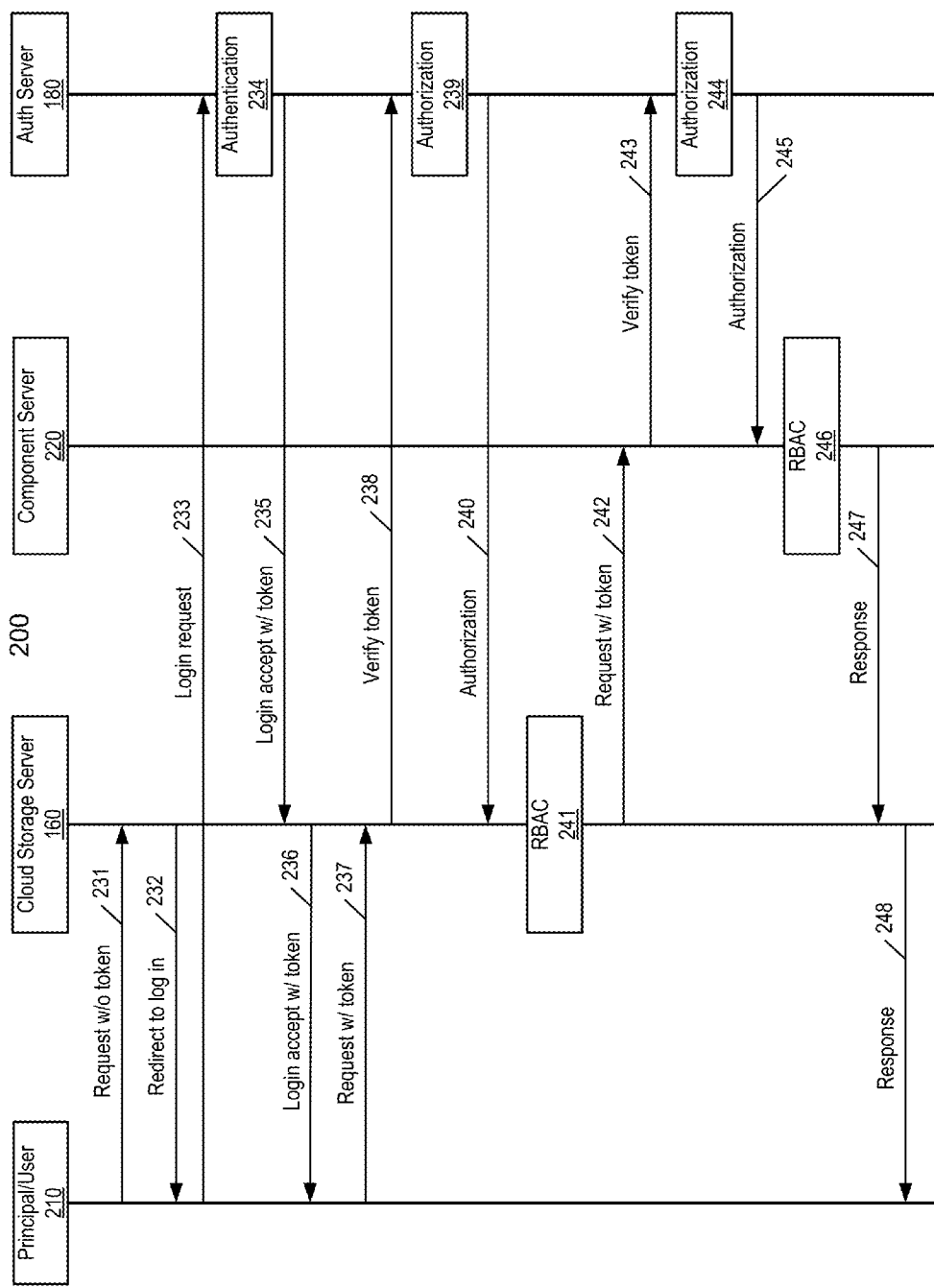
FIG. 2 is a transactional diagram illustrating an authentication/authorization process according to one embodiment of the invention.

FIG. 2 is a transactional diagram illustrating an authentication/authorization process according to one embodiment of the invention. For example, authentication/authorization process 200 may be performed by authentication/authorization system 100 in a multi-tenant environment. Referring to FIG. 2, process 200 includes, but is not limited to, principals/users 210 communicatively coupled to cloud storage server 160, component server 220, and auth server 180 via a bus/and our a network. In one embodiment, cloud storage server 160 receives an access request from user 210 via transaction 231 to access a resource to perform a set of particular operations within a particular tenant (i.e., roles). In one embodiment, in response to the access request from the user 210, cloud storage server 160 redirects the request via transactions 232 and 233 to request auth server 180 to authenticate the access request.

Further, in response to receiving the access request, at block 234, auth server 180 is configured to determine whether to allow or deny an authentication request (i.e., an access request to login) based on information contained in the authentication request and auth server store (not shown). In one embodiment, each authentication request includes credentials of a user. The credentials of the user include, but are not limited to, a user name and a password, wherein each user name and password identifies a requesting user (i.e., the user that sent the access request message). The credentials further contain a tenant identifier (ID) such as a tenant name (e.g., Tenant C), on which the requested access is to be performed. The credentials further include a domain ID such as a domain name (e.g. @DomainA, @DomainC, or @DomainIT) which identifies an identity source or identity provider (e.g., identity provider server 170 or local identity provider) associated with a particular tenant. It should be understood that the principals/users and tenants in the system have each been assigned a unique secured ID (SID).

According to one embodiment, auth server 180 processes the authentication request to allow or deny access to the user. For example, auth server 180 authenticates the authentication request by validating the credentials of the user that initiated the request by looking up the auth server store. The auth server 180 determines whether the user 210 is validated/authenticated to access the requested tenant by looking up the auth server store to determine that the user 210 is authenticated to access. For example, auth server 180 uses the specified credentials of the user to lookup the associated credentials in the auth server store. As used herein, "specified credentials" refer to a combination of one or more of the user ID, password, tenant ID, and domain ID, which are provided by the user (e.g., as part of a login process or as part of the authentication request itself).

Auth server 180 then uses the specified credentials to determine if the specified credentials match the associated credentials contained in the auth server store. It should be understood that a "match" refers to a user name, a password, a tenant name, and a domain name (i.e., the associated credentials) in the auth server store matching respectively the user name, the password, the tenant name, and domain name (i.e., the specified credentials) that were derived based on the authentication request. Thus, if the associated credentials in the auth server store do not match the specified credentials that were derived from the authentication request, then there is a mismatch and the requesting user is denied access.

According to one embodiment, auth server 180 processes the specified credentials of the authentication request, and if there is a match (i.e., successful), forwards the request with an access token (e.g., a Security Assertion Markup Language (SAML) token) to cloud storage server 160 for the requesting user via transaction 235, which forwards the token to user 210 via transaction 236. In one embodiment, the access token is associated to a unique hash that identifies a particular auth session associated with the requesting user as an authenticated user in the system (described in further details below). As used herein, an "authenticated user" refers to any requesting user that obtains an access token from an auth server (e.g., auth server 180).

According to one embodiment, subsequently user 210 may use the access token to request access to a particular resource of cloud server 160 via transaction 237. In response to receiving the access token associated with the authenticated user, cloud storage server 160 then determines whether to allow or deny a resource request from the authenticated user for accessing a particular resource (e.g., a data file, an object, a workflow, etc.) associated with a particular tenant (e.g., tenant 162) stored in a file storage (e.g., file storage 164). Further, in response to an authorization request, cloud storage server 160 transmits the access token to auth server 180 to validate the access token associated with the authenticated user via transaction 238. As used herein, an "authorization request" refers to a request from a cloud storage server to an auth server to determine whether an access token is validated.

According to one embodiment, auth server 180 is configured to authorize the authorization request by determining whether the access token is validated (i.e., the access token is not revoked and expired) at block 239. In response to determining the access token is validated, auth server 180 identifies a set of one or more tenants associated with user. For each tenant associated with the user, auth server 180 further determines a set of one or more roles within each tenant (i.e., a user may be associated with multiple tenants, and assigned multiple roles within different tenants). Further, for each role of the user within each tenant, auth server 180 determines a set of one or more privileges associated with each role.

In one embodiment, in response to the authorization request, auth server 180 processes the authorization request, and if validated (i.e., access token is not revoked and expired), generates/transmits an auth token to cloud storage server 160 via transaction 240 to allow the requested client to determine whether the user is allowed to access the particular resource within that particular tenant. For example, auth server 180 generates/transmits the auth token (e.g., SAML token) which includes, but is not limited to, the set of one or more tenants associated with the user, the set of one or more roles with each tenant, and the set of one or more privileges of each role (described in further detail below). In one embodiment, information associated with each tenant may be encrypted by a specific encryption key associated with the corresponding tenant. As a result, only a proper component associated with the tenant would have the necessary key to decrypt the information of the access token.

In one embodiment, in response to receiving the auth token, at block 241 cloud storage server 160 is configured to determine whether to allow or deny an authenticated/authorized user to access the particular resource within that particular tenant based on information contained in the auth token associated with that user. As used herein, an "authenticated/authorized user" refers to a user associated with an auth token that was authenticated and authorized by an auth server to access one or more tenants. According to one embodiment, cloud storage server 160 determines whether to allow or deny the authenticated/authorized user access by extracting and/or decrypting information from the auth token. Continuing on with the above example, cloud storage server 160 extracts information from the auth token which includes, but is not limited to, the set of one or more tenants associated with the authenticated/authorized user, the set of one or more roles with each tenant, and the set of one or more privileges of each role that are authorized to the authenticated/authorized user.

According to one embodiment, cloud storage server 160 retrieves a first tenant and a first role allowed to access the particular resource from a RBAC database associated with the requested client. Cloud storage server 160 further retrieves an access privilege, which includes a type of access (e.g., read, write, delete, etc.) authorized for the particular resource, from the RBAC database. Cloud storage server 160 then determines whether the auth token contains the first tenant, the first role, and the authorized access privilege obtained from the RBAC database. If so, cloud storage server 160 allows the user 210 to access the particular resource (i.e., the requested resource) and implement the access privilege (e.g., read/write) authorized for the particular resource.

In one embodiment, cloud storage server 160 may transmit the auth token associated with the user 210 to component server 220 (e.g., another component or tenant) via transaction 242, which may be involved with a new authorization request. For example, if other tenants or clients are involved with the new authorization request, cloud storage server 160 transmits the auth token to each involved tenant/client (e.g., component server 220) to validate/authorize the auth token for each authorization request. Continuing on with the example, component server 220 receives the auth token and transmits the auth token to auth server 180 for validation via transaction 243, which is validated by auth server 180 at block 244. Note that component server 220 may only be able to decrypt and extract a portion of the information stored in the auth token using a specific encryption key, where the key may be a different key possessed by clod server 160. That is, cloud server 160 and component server 220 may only be entitled to access different portions of the auth token since different portions may be encrypted with different encryption keys. If the auth token is validated again via transaction 245, component server 220 is to determine whether to allow or deny the user to access a new resource within the respective component at block 246. If the user is authorized to access the new resource within the respective component, component server 220 allows the user to access the new resource and implement the access privilege (e.g., read/write/delete) authorized for the new resource. A response is then transmitted back to cloud server 160 via transaction 247, which is then forwarded to user 210 via transaction 248. As a result, with a single login, a user can access the same or different tenants with different roles and different privileges of each role using the same auth token.

FIG. 3 is a block diagram illustrating an example of an access control list (ACL) database according to one embodiment of the invention. In this example as shown in FIG. 3, the ACL database includes one or more ACLs, and each ACL includes one or more access control entries (ACEs). The illustrated block diagram is a table, but another block diagram may work equally well, such as a list, a map, and a rational database. The table contains one or more ACEs, each ACE including a resource ID, a tenant ID(s), a role ID, and a privilege ID(s) to be utilized by a component (e.g., a client) to determine whether a user is allowed to access a resource associated with a particular tenant.

In one embodiment, ACE 1 is associated the following items: "ABC" resource, "Tenant C" tenant, "Operator" role, and "VIEW_EMAIL" privilege. For example, a first user with a first auth token which matches the items from ACE 1 is allowed to read emails for "ABC" resource within the "Tenant C" tenant as the "Operator" role that is associated with the first user. Further, ACE 2 is associated the following items: "ABC" resource, "Tenant C, Tenant B" tenants, "Email Admin" role, and "VIEW_EMAIL, DELETE_EMAIL" privileges. For example, a second user with a second auth token which matches the items from ACE 2 is allowed to read emails for "ABC" resource (i.e., the same "ABC" resource from ACE 1) within the "Tenant B" tenant as the "Email Admin" role that is associated with the second user. Continuing on with the above example, the first user may only read emails for "ABC" resource, while the second user may read emails for "ABC" resource and delete emails for "ABC" resource. In one embodiment, to determine whether a user is entitled to access a particular resource, ACL module 130 decrypts and extracts authorization information from the auth token and compares the information with the ACL information corresponding to the resource being accessed in the ACL database 150 as shown in FIG. 3. If the authorization information from the auth token matches the ACL information of the resource being accessed, the user will be allowed to access the resource. Otherwise, the user will be denied.

ACL database 180 may be implemented in a storage system such as cloud storage server 160 or any component which may perform/manage access control (e.g., RBAC components). It should be understood that a user may be associated with multiple ACEs which authorizes the user to have multiple roles within multiple tenants. Of course, the block diagram for illustrating an example of an ACL database may include additional and/or different parameters.

Figure 4:
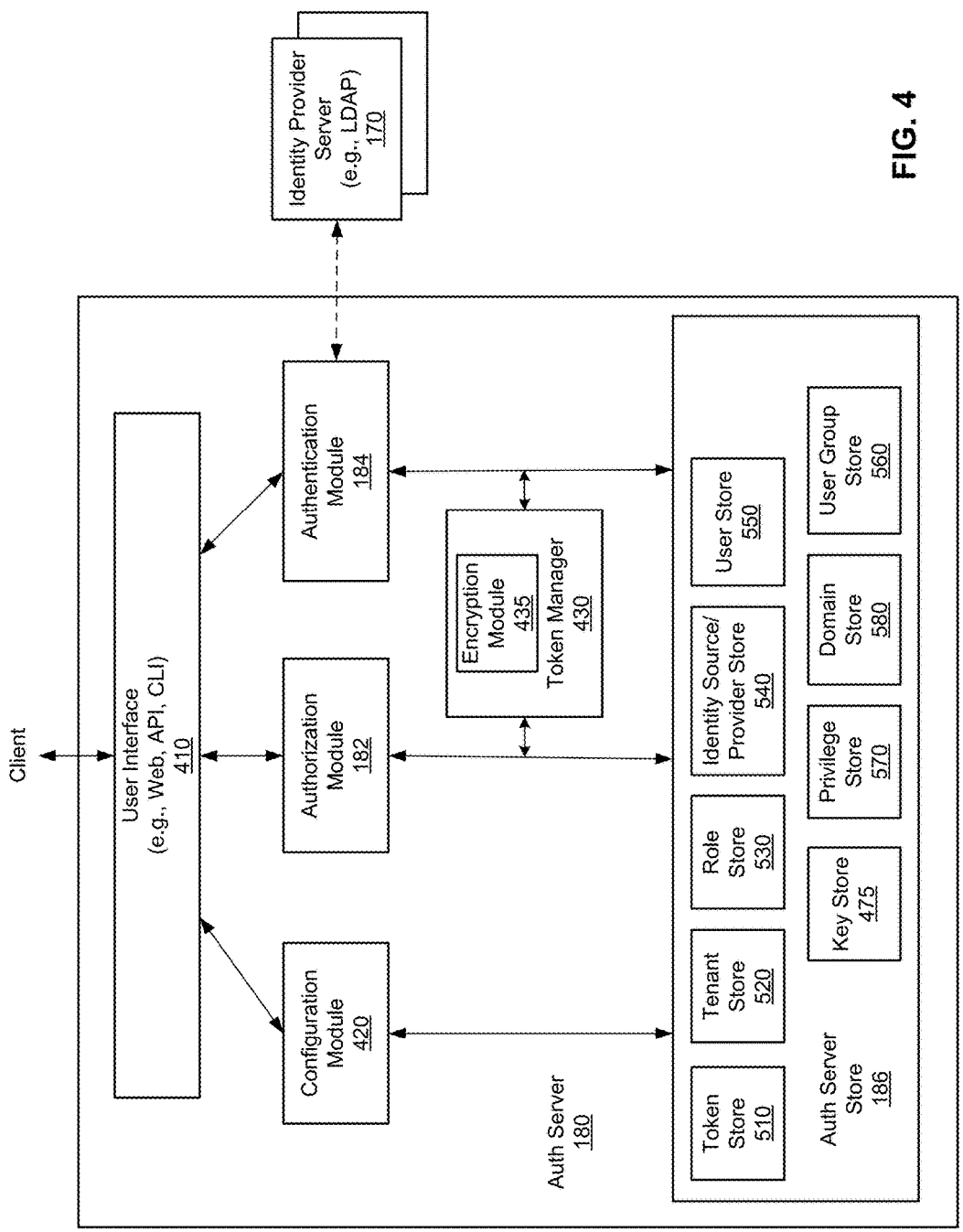
FIG. 4 is a block diagram illustrating an authentication/authorization system according to one embodiment of the invention.

FIG. 4 is a block diagram illustrating an authentication/authorization system according to one embodiment of the invention. FIG. 4 shall be described with reference to the example illustrated in FIG. 2. Referring now to FIG. 4. In one embodiment, auth server 180 includes, but is not limited to, user interface 410 communicatively coupled authentication module 184, authorization module 182, configuration module 420, token manager 430, and auth server store 186.

In one embodiment, auth server 180 includes user interface 410 configured to receive one or more access requests from one or more clients using the Remote Procedure Call (RPC), Hypertext Transfer Protocol Source (HTTPS), Representational State Transfer (REST) protocol, or any combination thereof. Here, an access request includes, but is not limited to, an authentication access request (also referred to as an authentication request), an authorization data access request (also referred to as an authorization request), or configure data access request. Here, an authentication access request refers to a request to perform a verification operation on a user (e.g., client), who attempts to log in to a tenant. User interface 410 processes the authentication access request, if the user has not been authenticated, and forwards the request to authentication module 184 after removing at least some of the networking stack related information from the request. Authentication module 184 receives the request from the user and verifies the identity of the user in any one or more identity provider components (e.g., identity provider server 170, identity source/provider 540). Authentication module 184 processes the request and verifies/authenticates the request by, for example, validating credentials of the user that initiated the request by looking up auth server store 186.

In one embodiment, each authentication request includes, but not limited to, a user ID (e.g., username), a password, a tenant ID, and/or a domain ID (i.e., the credentials of the user). Authentication module 184 determines whether the user is authenticated to access the requested tenant (e.g., the tenant ID provided as part of the login process or as part of the request itself) by looking up auth server store 186 to determine whether the credentials of the user identify/match a user (e.g., user 550) within auth server store 186, and determine which tenant(s) the user is allowed to access. For example, authentication module 184 uses the specified tenant ID and specified domain ID to lookup the associated tenant ID (e.g., tenant 520) and associated domain ID (e.g., domain 580) in the auth server store 186. As used herein, a "specified tenant ID" and "specified domain ID" refer to the names which are provided by the user (e.g., as part of a login process or as part of the authentication request itself). Then, an identity source/provider (e.g., identity/source provider 540) uses the specified user ID and specified password to verify/authenticate the identity of the user (e.g., user 550) associated with the obtained domain ID. As used herein, a "specified user ID" and "specified password" refer to the names which are provided by the user (e.g., as part of a login process or as part of the authentication request itself). In one embodiment, a particular identity source/provider (e.g., identity/source provider 540) may be associated with one or more domain IDs (e.g., domain 580) within one or more tenant IDs (e.g., tenant 520), which allows the user to provide one or more specified tenant names and corresponding specified domain names to authenticate/log in within one or more associated tenant IDs. By way of example, these associated IDs identify the tenant(s) that the user is allowed to access.

In one embodiment, authentication module 184 compares the credentials of the user (e.g., user ID, password, tenant ID, and domain ID) against the IDs obtained/contained in auth server store 186. By way of example, authentication module 184 may determine that the specified user name matches the user ID (e.g., the associated/determined user ID) contained in auth server store 186, which is associated with the ID contained in user 550. Further, authentication module 184 determines that the specified tenant ID (also referred to as requested tenant) matches the tenant ID contained in auth server store 186, which is associated with the ID contained in tenant 520. Further, authentication module 184 determines that the specified domain ID matches the domain ID contained in auth server store 186, which is associated with the ID contained in domain 580, respectively. Authentication module 184 determines that the specified password matches the password contained in auth server store 186. If there is a match for each credential of the user, authentication module 184 determines that the user is authenticated/granted to access the specified tenant. If there is at least one that does not match, authentication module 184 then denies access to the requesting user. In alternative embodiment, identity provider server 170 verifies the credentials of the user and forwards an external authentication of the user to authentication module 184. Note that block 170 is optional because a client can be authenticated by the existence of the authentication module and auth server store. Also note that, according to this embodiment, authentication module 184 identifies the specified tenant ID and then the specified domain ID, which are located in auth server store 186, while an external identity provider server (e.g., identity provider server 170) then identifies the user with the specified user ID and verifies the specified user ID with the specified password.

In response to determining the user is authenticated to access the specified tenant, authentication module 184 forwards the authentication request to token manager 430. In one embodiment, token manager 430 is responsible for receiving one or more authentication requests and generating access tokens to identify users that are authenticated by authentication module 184 (or identity provider server 170). Here, a token manager is configured to generate one or more access tokens and validate access tokens (e.g., as part of an authorization request) by determining whether an access token is expired and/or revoked. As used herein, an "access token" may refer to a unique hash that identifies authentication of a requesting user. The access token can be used as a reference ID to obtain an auth token (described in further detail below). In one embodiment, token manager includes, but is not limited to, a hash table identifying one or more authenticated users. When an access token is received, token manager 430 hashes at least a portion of the access token and compares the hash of the access token with hashes stored in the hash table (not shown). If the hash of the access token is found in the hash table, it means that the user has been previously authenticated. In one embodiment, if the user has not been authenticated or previous authentication expired, its hash would not be or would be removed from the hash table. Continuing on with the above example, token manager 430 processes the authentication request, and after a successful authentication, generates an access token for the requesting user. In response to the successful authentication, token manager 430 forwards the access token to authentication module 184, which forwards the access token to user interface 410. User interface 410 transmits the access token to the user which allows the user to access (i.e., log into) the requested tenant.

In one embodiment, auth server 180 includes user interface 410 configured to receive one or more authorization data access requests from one or more clients using the Remote Procedure Call (RPC), Hypertext Transfer Protocol Source (HTTPS), Representational State Transfer (REST) protocol, or any combination thereof. Here, an authorization request includes, but is not limited to, a data access request from an authenticated user, an access token from the authenticated user, and/or a request to determine which role(s) are assigned/authorized to the user within a requested tenant (e.g., the tenant specified/authenticated at the login process) and/or one or more child tenants of the requested tenant. Here, a data access request can be a read, write, delete, and/or replicate request.

User interface 410 processes the authorization request, if the user is authenticated, and forwards the authorization request with the access token of the authenticated user to authorization module 182. Authorization module 182 receives the request from the user and validates the access token by verifying that the access token is not expired and revoked, for example, by token manager 430. In one embodiment, token manager 430 is invoked to verify whether a particular token is still valid, for example, by comparing the hash of the access token with the corresponding one in the hash table. In response to the validated access token, authorization module 182 determines whether the user is authorized to access the data by looking up auth server store 186 to determine which roles(s) the user is authorized to perform. For example, authorization module 182 uses the validated access token to obtain a user ID obtained in auth server store 186 by looking up the specified user name provided by the user as part of the login process or as part of the request itself. Authorization module 182 then uses the user ID to obtain one or more associated tenant IDs (e.g., tenant 520) from auth server store 186. By way of example, the one or more associated tenant IDs refer to the specified tenant provided by the user and, if the specified tenant is a parent tenant, one or more child tenants associated with the specified tenant. Authorization module 182 then uses the tenant IDs to obtain one or more associated role IDs (e.g., role 530) from auth server store 186. Further, authorization module 182 uses the one or more role IDs to obtain one or more associated privilege IDs (e.g., privilege 570) from auth server store 186. These associated IDs identify the roles and privileges that the user is authorized to perform within the specified tenant (identified at the user's login) and/or the child tenants of the specified tenant.

In response to determining the authorized roles and tenants, authorization module 182 forwards the authorization request to token manager 430. In one embodiment, token manager 430 is responsible for receiving one or more authorization requests, generating one or more auth tokens, and encrypting the one or more auth tokens (described in further detail below). Continuing on with the above example, token manager 430 processes the authorization request and generates an auth token based on information identifying one or more tenants associated with the user, one or more roles of the user with each tenant, and one or more privileges associated with each role. Further, encryption module 435 then encrypts the information into one or more encrypted blocks in the auth token using one or more public keys that are associated with one or more tenants (described in further detail below). Encryption module 435 then encapsulates the one or more encrypted blocks in the auth token. In response to encapsulating the encrypted blocks, token manager 430 forwards the encrypted auth token to authorization module 182 and then authorization module 182 forwards the encrypted auth token to user interface 410. User interface 410 transmits the encrypted auth token to the client to allow the client to determine whether the user is allowed to access a requested resource based on the auth token. Note that a tenant associated with an auth token is required to have a corresponding private key to decrypt an encrypted block allocated to the tenant.

In one embodiment, auth server 180 includes user interface 410 configured to receive one or more control access requests from one or more clients using the Remote Procedure Call (RPC), Hypertext Transfer Protocol Source (HTTPS), Representational State Transfer (REST) protocol, or any combination thereof. Here, a control access request refers to a request to perform an operation on an object. An operation includes, but is not limited to: 1) creating new roles in particular tenants, 2) configuring privileges, 3) creating/generating/accessing role assignments (including role and user information), 4) configuring namespaces and policies, 5) listing the objects associated with a tenant, 6) listing the ACEs/ACLs that are associated with the objects that are associated with a tenant, 7) associating/disassociating objects with/from a tenant, and 8) listing the users/groups associated with a tenant, 8) associating/disassociating users/groups with/from a tenant.

The definition of an object depends on the operation that is being requested. For example, an object can be a: 1) file system auth object (FSAO) (where a FSAO refers to a unit of storage allocation that presents a unique and self-contained namespace for a tenant, each tenant can be allocated one or more FSAOs, and each object is assigned with the ownership of an authenticated principal that created the object), 2) policies (where a policy refers to a set of object ACLs for one or more namespaces of a tenant, and these policies are applied when no parent object is specified during the object creation and the parent ACLs may not be inherited), and 3) user/group user/group (where a user can be a local user (e.g., user definitions stored in the storage system operating system), or name-service user (e.g., Active Directory (AD), Network Information Service (NIS), etc.); users can be classified as either configuration-users (i.e., admins who perform control/configure/manage operations), or as data-access users (i.e., users who only access data); note that groups may be defined in some name service such as AD, NIS, wherein the same groups can be associated with a tenant with the roles of tenant-admin/tenant-user; if any user logs in to the system which is part of such a group, that user will have the assigned tenant-admin/tenant-user role.

In one embodiment, in order to provide security and isolation, the control operations which may be performed by the requesting user depends on the role associated with the requesting user. For example, while a system admin may perform all operations, an operator user (also referred to as a tenant user) may be allowed to perform only a subset of the operations and/or subset of the objects that are available to the tenant admin. The operations which are available to the roles are defined through the auth server store 186, described in further details below. In response to a control access request, user interface 410 determines whether the user is authenticated to perform the control access request. User interface 410 processes the request if the user is authenticated, and forwards the request to configuration module 420. Configuration module 420 determines whether the requesting user is authorized to perform the requested operations on the object based on auth server store 186.

According to one embodiment, configuration module 420 determines the roles of the requesting user, for example, by deriving the auth token of the user or by using the specified user name to lookup auth server store 186. If configuration module 420 determines that the requesting user has a required role to perform the requested operations, configuration module 420 grants the request of the requesting user. If not, configuration module 420 denies the request. After determining that the user is authorized to perform the requested operation, configuration module 420 determines whether the user is authorized to access the object on which the requested operation is to be performed. Configuration module 420 may invoke authentication module 184 and/or authorization module 182 to determine whether a particular user is entitled to modify the information stored in the auth server store.

Note that each of stores as shown in FIG. 4 may be maintained via one or more databases or data structures and managed by one or more management logic. In one embodiment, token store 510 stores tokens of specific access sessions of specific users, which may be manage by token manager 430. Tenant store 520 stores tenant objects representing a variety of tenants, which may be managed by a tenant manager (not shown). Role store 530 stores roles object represent a variety of roles, which may be managed by a role manager. Identity source/provider store 540 may be managed by an identity manager or identity provider. Identity source/provider store 540 stores identity source objects each specify an identity provider used to authenticate a particular user. User store 550 stores user objects representing a variety of users, which may be managed by a user manager. Key store 475 stores encryption keys (e.g., public keys of key pairs) for encrypting different sections of an auth token, which may be managed by a key manager. Privilege store 570 stores privilege objects presenting various privileges, which may be managed by a privilege manager. Domain store 580 stores domain objects representing various domains, which may be managed by a domain manager. User group store 560 stores user group objects representing different user groups, which may be managed by a user group manager. These managers may be invoked by configuration module 420, authorization module 182, and authentication 184 for accessing their respective objects of their respective stores. Modules 420, 182, and 184, as well as the managers described above may be loaded in a memory (e.g., random access memory or RAM) and executed by one or more processors of auth server 180. Store 186 may be maintained and stored in a persistent storage device such as a hard disk or storage appliance associated with auth server 180.

In one embodiment, in order to determine whether the user is authorized to access the requested object, configuration module 420 or authorization module 182, for example, derives the auth token to obtain the tenant IDs that are associated with the user, or uses the user ID (associated with the specified user name) to lookup auth server store 186 to obtain the tenant IDs that are associated with the user. The tenant IDs obtained identify the tenant that can be accessed by the associated user. Configuration module 420 uses these obtained tenant IDs to access auth server store 186 to determine the corresponding object types as the object on which the operation is to be performed. After the configuration module 420 determines the required information (e.g., the determined: tenant, role, privilege, and user) to access the requested object, configuration module 420 performs RBAC to then determine whether the user is authorized to access the requested object. If so (e.g., the information derived from the user's auth token matches the required role, privilege, user, and, tenant to access the requested object), configuration module 420 grants the user access to the requested object. If not, configuration module 420 denies the request.

In one embodiment, auth server store 186 includes, but is not limited to, token store 510, tenant store 520, role store 530, identity source/provider store 540, user store 550, user group store 560, key store 475, privilege store 570, and domain store 580 (each object is described in further detail below). According to one embodiment, key store 475 is responsible for storing information identifying one or more keys associated with one or more tokens contained in token store 510. Key store 475 is also responsible for storing one or more pubic keys associated with one or more tenants contained in tenant store 520, and each public key corresponds to a private key maintained by each tenant contained in tenant store 520. Note that some or all of the components shown as part of auth server 180 in FIG. 4 may be implemented in software, hardware, or a combination thereof. For example, some or all of the shown components may be implements in a form of executable instructions that can be stored in a machine-readable storage medium, which when executed, loads the components into an operation system of auth server 180. Some or all of the components in FIG. 4 may also be stored as part of a persistent storage device. For example, auth server store 186 may be stored as part of a persistent storage device, and loaded into memory during operation.

Figure 5:
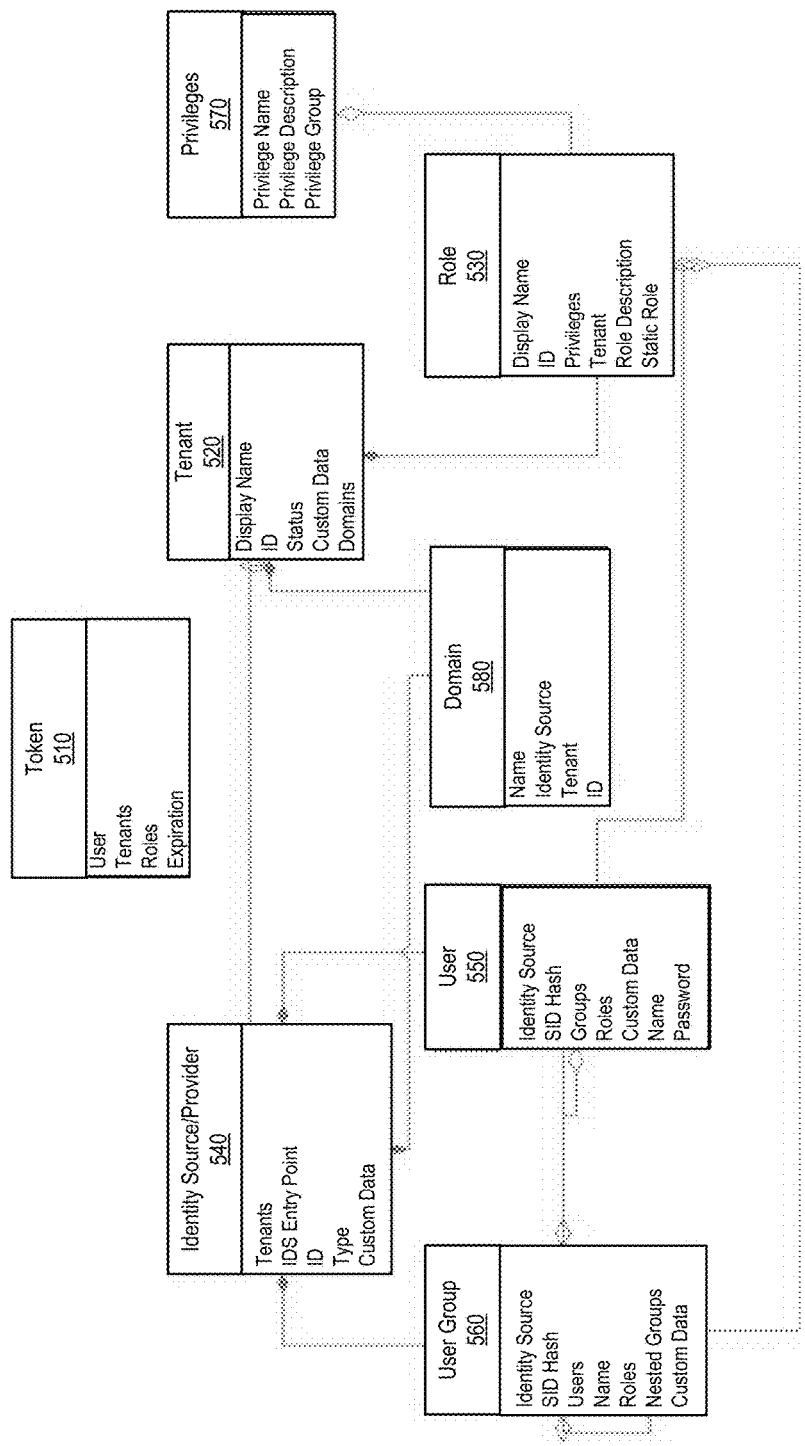
FIG. 5 is a block diagram illustrating an authentication/authorization store according to one embodiment of the invention.

FIG. 5 is a block diagram illustrating an authentication/authorization database according to one embodiment of the invention. FIG. 5 illustrates an example of auth server store 186 and includes various data objects (e.g., Tenant 520). In one embodiment, each data object includes, but is not limited to, one or more sets of elements (e.g., display name, SID hash, ID, tenant, etc.).

Referring to FIG. 5, auth server store 186 includes, but is not limited to, one or more data objects or data structures, such as token object 510, tenant object 520, role object 530, identity source/provider object 540, user object 550, user group object 560, privileges object 570, and domain object 580. These objects represent an instance of one of the objects stored in the corresponding stores as shown in FIG. 4. For the purpose of illustration and simplicity, the reference numbers are maintained the same with respect to their corresponding stores. In this example as shown in FIG. 5, for example, token object 510 and token store 510 are interchangeable terms. When an object is described, it is appreciated such an object is stored and accessed in its corresponding store identified by the same reference number. Each of these objects defines specific parameters for the specific object. One object may link with one or more other objects. Token 510 represents an auth token associated with a specific user, where token 510 may be a root parent object or a placeholder linking with other objects that define the attributes or parameters of the token. For example, tenant 520 includes information defining a particular tenant, which is defined by a specific tenant ID. Role 530 includes information defining a specific role. User 550 includes information defining a specific user. Domain 580 includes information defining a particular domain. User group 560 includes information defining a particular user group.

If a user represented by token object 510 is a member of multiple tenants, token object 510 will include one or more pointers linking with multiple tenant objects 520, each defining specifically one of the tenants of which the user is a member. For each of the tenants represented by the respective tenant object, the corresponding tenant object includes pointers linking with one or more role objects 530, where each of the role objects 530 defines a specific role within the tenant that the user has. In one embodiment, if a tenant is a child tenant of another tenant as a parent tenant, the child tenant object includes a parent tenant property storing a parent tenant ID identifying the parent tenant, i.e., the parent tenant object. Similarly, a parent tenant object may optionally include a child parent property storing a child tenant ID identifying a child tenant, e.g., a child tenant object. As a result, a tenant hierarchy tree is formed based on the relationships of tenants/tenant objects. Each of the role objects 530 includes pointers linking with one or more privilege objects 570, where each privilege object 570 defines a specific privilege. If the user is also a member of a particular user group (e.g., user group object 560), user object 550 defining the user will include a link referencing to a user group object that defines that particular user group. That is, when the auth server attempts to determine the user's tenants, roles, and privileges, etc., the auth server can obtain the user's token object 510 and "walk" through the objects in the chain or a tree hierarchy.

In one embodiment, auth server store 186 is configured to manage token 510 (also referred to as an auth token) for associating/mapping user 550 to role 530 at tenant 520. Further, users may be associated with additional and/or different roles within different tenants. For example, a user may be associated with an "Admin@TenantC/TenantHR" role with admin privileges within Tenant C/Tenant HR, while the user has no authorization (i.e., admin role and/or privileges) within Tenant C which is a parent-tenant of the Tenant C/HR tenant.

In one embodiment, token 510 allows a client (e.g., cloud storage server 160) to determine whether a user (or a user from a user group) is allowed to access one or more resources based on auth server store 186 associating/mapping the user to one or more roles within a tenant, and each role is further associated/mapped to one or more privileges. According to one embodiment, token 510 includes, but is not limited to, a user, a tenant, one or more roles, and an expiration. Token 510 is configured by auth server 180 in response to verifying/authenticating an access token that is validated (i.e., the access token is not expired and revoked).

In response to the validated access token, auth server 180 generates token 510 and transmits token 510 to the requesting user/component. Token 510 includes information identifying a set of one or more roles assigned to the requesting user. The set of one or more roles are generated based on a specific tenant that the requesting user specified in his/her access request (i.e., the tenant name specified at login). For example, if the requesting user is authenticated, auth server 180 transmits token 510 to the requesting user. After the successful authentication, token 510 includes the set of one or more roles assigned to the requesting user within that specified tenant, and further includes a set of one or more roles associated with one or more tenants (e.g., child-tenants) which are associated with that specified tenant according to a tenant tree hierarchy.

In one embodiment, tenant object 520 is a highest unit of abstraction for providing security and isolation in a multi-tenant environment. Tenant 520 provides an authorization scope of logical data isolation. For example, multi-tenant components (e.g., clients 101-102) may store their data in shared storage systems (e.g., cloud storage server 160), however each component must provide isolation for each resource associated with each tenant to avoid a first client accessing a resource from a second client.

In one embodiment, auth server store 186 provides the desired security and isolation by allowing each tenant (e.g., tenant 520) to configure their own: identity providers (e.g., identity source 540), users and user groups (e.g., user 550 and user group 560), and roles (e.g., role 530), which are associated with one or more privileges (e.g., privileges 570) and assigned to users to operate/perform within that particular tenant. Further, tenant 520 includes a parent-tenant element which allows a first tenant to create a new tenant, and if a second tenant is not specified as a parent-tenant of the new tenant, the first tenant is associated to the new tenant as the parent-tenant. Further, each resource request and operation (e.g., read/write) must be performed in a particular tenant.

According to one embodiment, privileges object 570 identifies a set of one or more privileges or permissions defining one or more operations which a user is authorized to perform in a multi-tenant environment. As used herein, an "operation" refers to an access privilege that includes a type of access (e.g., read/write) authorized for a resource. Each component in the multi-tenant environment is configured to implement/perform privileges associated with the user. For example, privileges 570 includes a "read email" privilege that provides a component managing access control to allow a user with the "read email" privilege to perform the "read email" operation. However, privileges 570 does not indicate a particular tenant in which, for example, the "read email" operation can be performed. Rather, a privilege object can be associated with a role object by specifying in a privilege property or attribute of the role object. A role object can then be associated with a tenant object by specifying a tenant property or attribute of the role object, etc., as shown in FIG. 5.

In one embodiment, role object 530 includes, but is not limited to, one or more privileges associated with a particular tenant which can be assigned to user 550 and user group 560. For example, role object 530 may include one or more links linking with one or more of privilege object 570, each instance of privilege object 570 defining a different privilege. Each role (e.g., system admin, tenant admin, tenant operator, etc.) associates user 550 and/or user group 560 with a tenant and a set of one or more privileges which the user/user group can perform within the tenant. Similarly, user object 550 may include one or more references linking with one or more of user group object 560, each instance of user group object 560 defining a specific user group. Further, each of user object 550 and user group object 560 includes, but is not limited to, one or more roles that a user or a set of one or more users (i.e., a user group) is authorized to perform. In one embodiment, in order to provide security and isolation, the access control operations which may be performed by the requesting user depends on his/her role. For example, while a system admin may perform all operations, a tenant admin may only be authorized to perform a subset of the operations on a subset of the resources. A tenant user may be allowed to perform only a subset of the operations and/or subset of the resources that are available to the tenant admin. The operations which are available to the roles are defined, for example, through privileges 570 (also reference FIG. 7).

In one embodiment, identity source/provider object 540 defines, but is not limited to, an authentication provider such as a local user storage (i.e., internal user and user group account stores), LDAP (e.g., identity provider server 170), and/or Active Directory (AD). The authentication provider verifies/identifies a user based on a user ID, a password, a domain ID, and a tenant ID, or any other type of authentication protocol. Each identity source must be associated with one or more tenants which then allows principals of the identity source to request authentication/authorization within a particular tenant associated with that identity source. An identity source/provider may be shared by multiple users, multiple domains, and/or multiple tenants.

In one embodiment, one or more identity sources are configured to implement a tree structure that associates/maps a defined distinguished entry point with a specific host. For example, when identity source/provider object 540 is associated with a tenant (e.g., tenant object 520), identity source/provider object 540 is then assigned a "domain alias" (i.e., a domain ID). Note that in some embodiments, identity source/provider 540 may be named/identified differently in different tenants, however identity source/provider 540 may be associated with the same authentication provider.

According to one embodiment, domain object 580 defines, but is not limited to, an identity source (e.g., identity source/provider object 540), which is used to identify users within a particular tenant. Each tenant may have one or more domains (also referred to as domain names), and each domain is associated with a single identity source/provider. For example, if a user requests authentication at a particular tenant which is associated with multiple identity sources, domain 580 provides auth server store 186 with the specific authentication provider (e.g., LDAP, AD, etc.) associated with that particular tenant to allow auth server 180 to identify/verify the requesting user. It should be understood that FIG. 5 is an illustrated example of auth server store 186. That is, auth server store 186 may include additional and/or different data objects, which may be communicatively coupled in a different order.

These objects can be traversed at runtime to perform a variety of authentication and/or authorization. In one embodiment, in response to an authentication request of a user, authentication module 184 extracts a user ID, a password, a tenant ID of a tenant the user attempts to access, and a domain ID of a domain within the tenant. Note that a tenant may have different domains associated with the same or different identity sources or providers, which may be local or remote providers. Based on the tenant ID, authentication module 184 identifies and retrieves, for example, via a tenant manager, a tenant object corresponding to the tenant from a tenant store (e.g., tenant object 520). From the tenant object, authentication module 184 determines whether the tenant object contain a domain that matches the domain ID. If so, authentication module 184 identifies and retrieves, for example, via a domain manager, a domain object associated with the identified domain (e.g., domain object 580) from a domain store based on the domain ID. From the domain object, authentication module 184 identifies and retrieves, for example, via an identity manager, an identity source/provider object from an identity source store based on an identity source ID obtained from the domain object. The identity source/provider object includes a list of users that are identified by the corresponding identity provider. From the identity source object, authentication module 184 identifies and retrieves, for example, via a user manager, a user object (e.g., user object 550) based on the user ID obtained from the authentication request. Authentication module 184 then compares a first password obtained from the authentication request with a second password stored in the user object. If the first and second passwords are matched, the user is authenticated.

According to another embodiment, when a token such as token 510 is generated during an authorization process in response to an authorization request, authorization module 182 obtains a user object, i.e., user object 550, corresponding to the user of the authorization request based on the user ID, tenant ID, and/or domain ID extracted from the authorization request. From user object, authorization module 182 identifies a list of roles associated with or assigned to the user. If a user is also a member of a user group, the user object further includes a user group ID identifying a user group, which may be represented by a user group object (e.g., user group object 560). A user group may be associated with a set of roles as well. As a member of the user group, a user inherits the roles of the corresponding user group. A user group object includes a list of one or more roles represented by a list of one or more role objects (e.g., role object 530). For each of the roles, which may be identified via a user object and/or user group object(s) associated with the user being authorized, a role object such as role object 530 is identified and obtained. From each role object, a corresponding tenant is identified, which may be represented by a tenant object (e.g., tenant object 520). From the role objects associated with the user, for example, from a tenant property of each role object, a list of tenants associated with the user may also be identified. In addition, a list of privileges of the role is also identified from the role object, where each privilege is represented by a privilege object such as privilege object 570. Thus, by traversing tenant object 520, domain object 580, identity source/provider object 540, user object 550, user group object 560, role objects 530, and privilege objects 570, authorization module 182 is able to identify a list of roles, privileges of each role, and tenants of the roles associated with the user. The information representing the tenants and roles are then compiled into token 510, optionally encrypted by one or more encryption keys.

Figure 6:
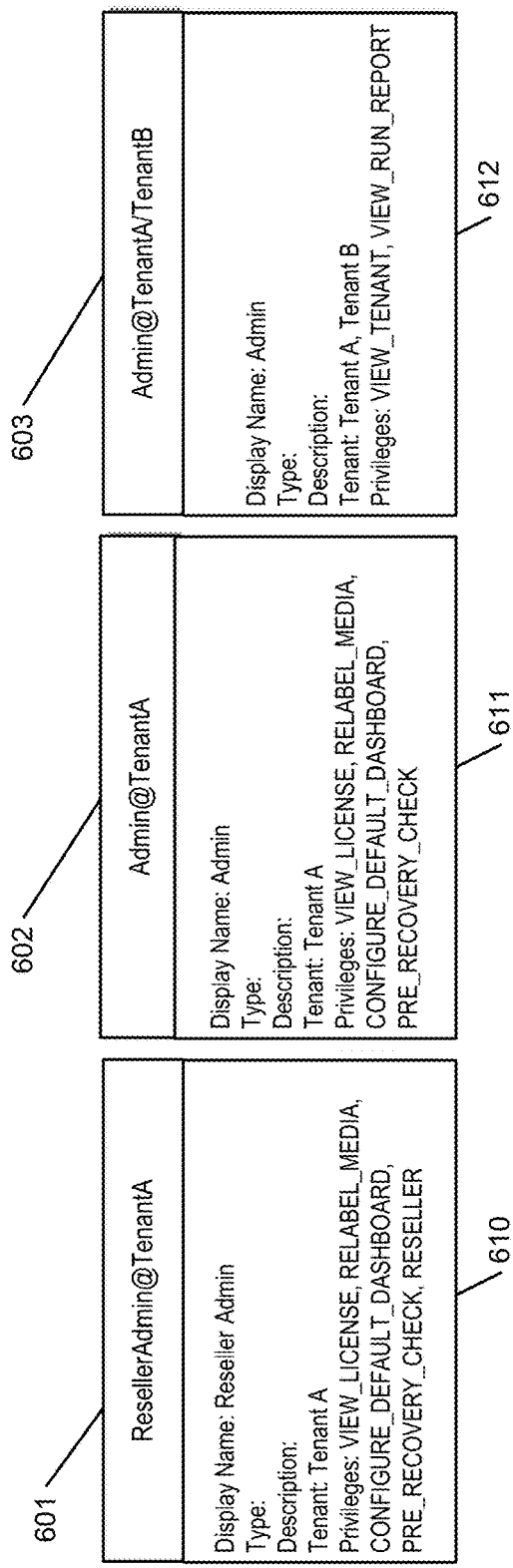
FIG. 6 is a block diagram illustrating an example of roles according to one embodiment of the invention.

FIG. 6 is a block diagram illustrating an example of roles/tenants according to one embodiment of the invention. For example, the illustrated roles may be configured by auth server 180 and associated with one or more users in a multi-tenant environment. Referring now to FIG. 6, the illustrated example includes three different roles: "ResellerAdmin@TenantA" role 601, "Admin@TenantA" role 602, and "Admin@TenantA/Tenant B" role 603. Continuing on with the above example, each illustrated role may be used by cloud storage server 160 to allow a client to determine whether a user is allowed to access a resource from a particular tenant.

In one embodiment, each role includes a set of one or more parameters (e.g., blocks 610-612). The set of one or more parameters includes, but is not limited to, a display name, a type, a description, one or more tenants (i.e., a tenant and one or more child-tenants associated with the tenant), and one or more privileges. Roles 601-603 may be generated/associated with one or more auth tokens (not shown) which are used by tenants/components to authorize and manage users access control in a multi-tenant environment. For example, if a first user is associated with "Admin@TenantA" role 602, the first user is allowed to perform all the privileges in blocks 611-612 at "Tenant A" and "Tenant B" tenants (i.e., "Tenant B" is a child-tenant of "Tenant A"), while the first user is denied the privilege of {"privilege":"Reseller'} in block 610 at "Tenant A" tenant.

Figure 7:
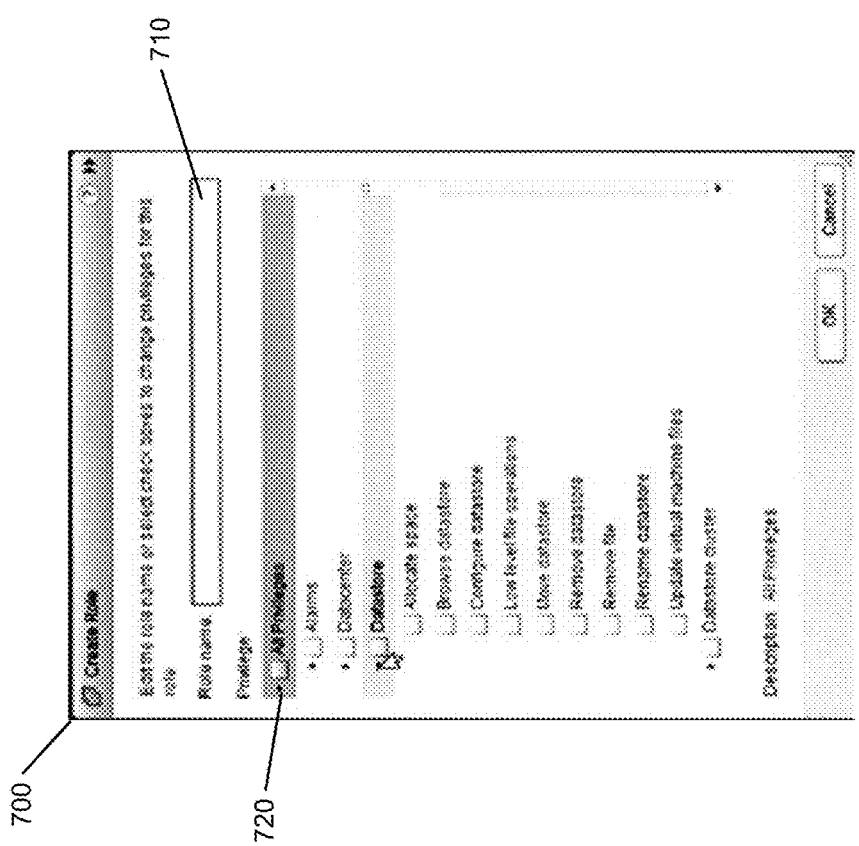
FIG. 7 is a screen shot showing a user interface to create a role according to one embodiment of the invention.

FIG. 7 is a screen shot showing a user interface to create a role according to one embodiment of the invention. FIG. 7 shows an example of a user interface 700 that is used to create/modify a role 710 with a set of one or more privileges 720. The view of the set of one or more privileges 720 may be in a form of, but are not limited to, a list display or a hierarchical display. For example, privileges are grouped into functional areas (e.g., alarms, datastore, infrastructure, policy, recover, etc.) to provide principals with a user-friendly interface (e.g., user interface 700). For example, user interface 700 can be performed by auth server 180. In one embodiment, auth server 180 initially includes a predefined set of roles with preassigned privileges which may not be modified. User interface 700 may be implemented in software, firmware, hardware, or any combination thereof.

In one embodiment, a principal who is authenticated/authorized by auth server 180 can create a new role 710 with a set of one or more privileges 720 to modify auth server store 186. One or more privileges 720 must be assigned to the new role 710. Further, each principal/tenant can associate a different subset of privileges with a role. For example, new role 710 may consist of different set of privileges at different tenants. New role 710 (e.g., BackupAdministrator) is defined as a container of one or more privileges 720 within a particular tenant (e.g., BackupAdministrator@TenantC). New role 710 can then be assigned to one or more principals (e.g., users, user groups). It should also be understood that FIG. 7 is an illustration of an example of a user interface, but the user interface may include additional and/or different parameters.

Figure 8:
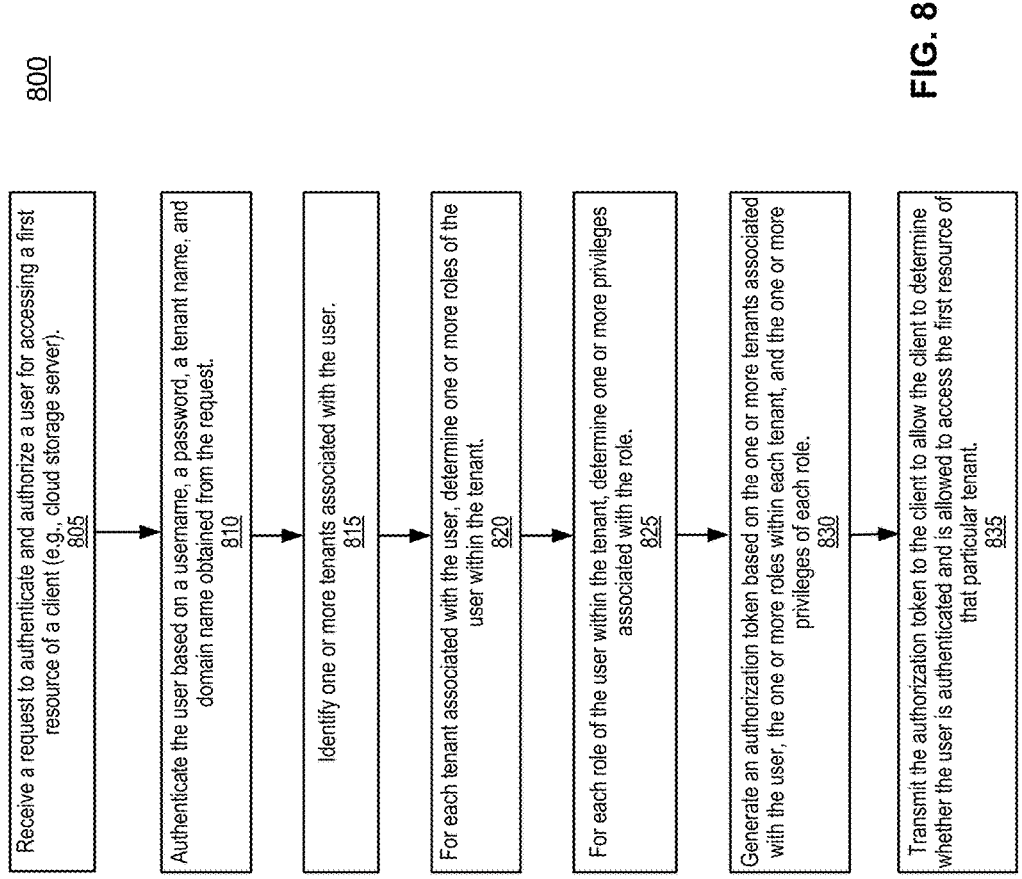
FIG. 8 is a flow diagram illustrating a method for authenticating and authorizing users in a multi-tenant environment according to one embodiment.

FIG. 8 is a flow diagram illustrating a method for authenticating and authorizing users in a multi-tenant environment according to one embodiment. For example, method 800 can be performed by auth server 180. Method 800 can be implemented in software, firmware, hardware, or any combination thereof. Referring now to FIG. 8, at block 805, an authentication/authorization server receives a request to authenticate and authorize a user for accessing a first resource of a client (e.g., cloud storage server). For example, auth server 180 authenticates and authorizes users accessing resources of one or more tenants. At block 810, an authentication/authorization server authenticates the user based on a user ID such as a username, a password, a tenant ID, and domain ID obtained from the request. For example, auth server 180 authenticates a user's credentials by verifying the user's credentials in auth server store 186. At block 815, an authentication/authorization server identifies one or more tenants associated with the user. At block 820, for each tenant associated with the user, an authentication/authorization server determines one or more roles of the user within the tenant. At block 825, for each role of the user within the tenant, an authentication/authorization server determines one or more privileges associated with the role. At block 830, an authentication/authorization server generates an access token that refers to an auth token which is based on information identifying one or more tenants associated with the user, the one or more roles within each tenant, and the one or more privileges of each role. For example, auth server 180 generates an access token referring to an auth token, which includes one or more roles associated with one or more tenants, for an authenticated and/or authorized user. At block 835, an authentication/authorization server transmits the access token to the client to allow the client to determine whether the user is authenticated and to obtain the corresponding auth token, which will allow the client to determine whether the user is allowed to access the first resource of that particular tenant. For example, auth server 180 transmits the access token to a client to allow the client to determine whether the user is authenticated, and then perform RBAC to determine whether the client's ACE/ACL for a first resource matches the roles derived from the auth token, which contains each role authorized within a respective tenant.

Figure 9:
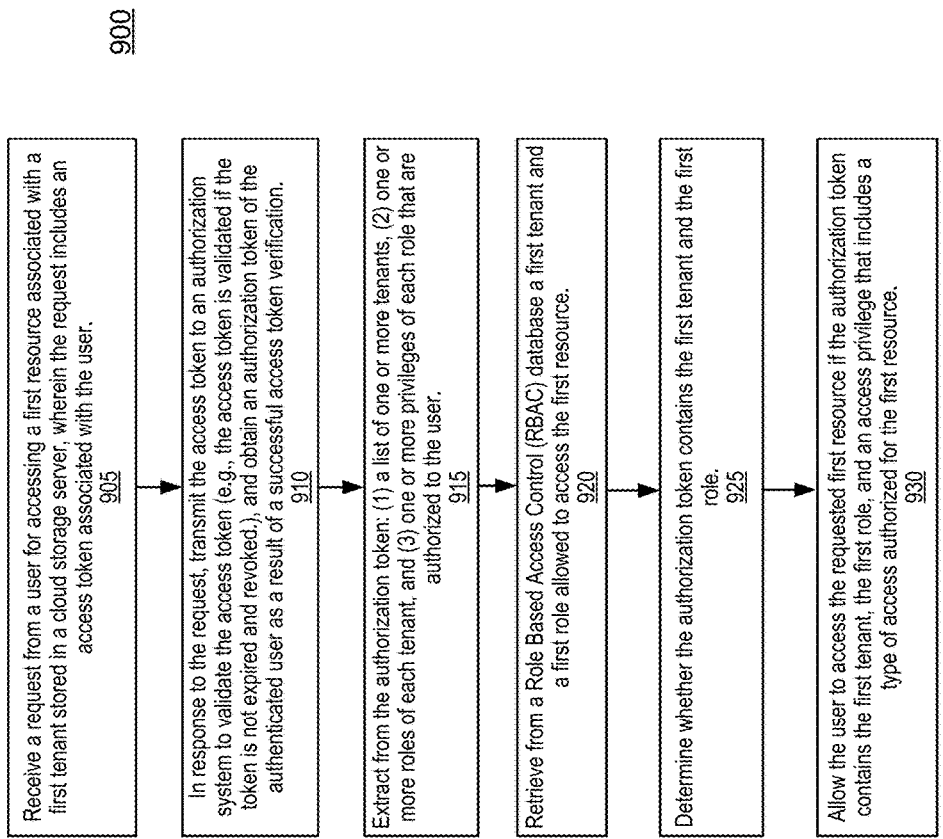
FIG. 9 is a flow diagram illustrating a method for determining whether a role request from a user in a multi-tenant environment should be allowed or denied, according to one embodiment.

FIG. 9 is a flow diagram illustrating a method for determining whether a role request from a user in a multi-tenant environment should be allowed or denied according to one embodiment. For example, method 900 can be performed by cloud storage server 160. Method 900 can be implemented in software, firmware, hardware, or any combination thereof. Referring now to FIG. 9, at block 905, a cloud storage server receives a request from a user for accessing a first resource associated with a first tenant stored in a cloud storage server, wherein the request includes an access token associated with the user. At block 910, in response to the request, a cloud storage server transmits the access token to an authorization system to validate the access token. For example, cloud storage server 160 transmits the access token to auth server 180 to validate the access token by determining whether the access token is expired and/or revoked (i.e., a valid access token is not expired and revoked). As a result of a successful access token verification, cloud storage server 160 obtains an auth token of the authenticated user. At block 915, a cloud storage server extracts from the auth token: (1) a list of one or more tenants, (2) one or more roles of each tenant, and (3) one or more privileges of each role that are authorized to the user. At block 920, a cloud storage server retrieves from a RBAC database a first tenant and a first role allowed to access the first resource. For example, cloud storage server 160 (e.g., a client) retrieves from its corresponding ACE/ACL a first tenant and a first role that are required to access the first resource. At block 925, a cloud storage server determines whether the auth token contains the first tenant and the first role. For example, a component of cloud storage server 160 performs RBAC to determine if there is a match between an ACE of the first resource and the auth token associated with the user. At block 930, a cloud storage server allows the user to access the requested first resource if the auth token contains the first tenant, the first role, and an access privilege that includes a type of access authorized for the first resource.

Figure 10A:
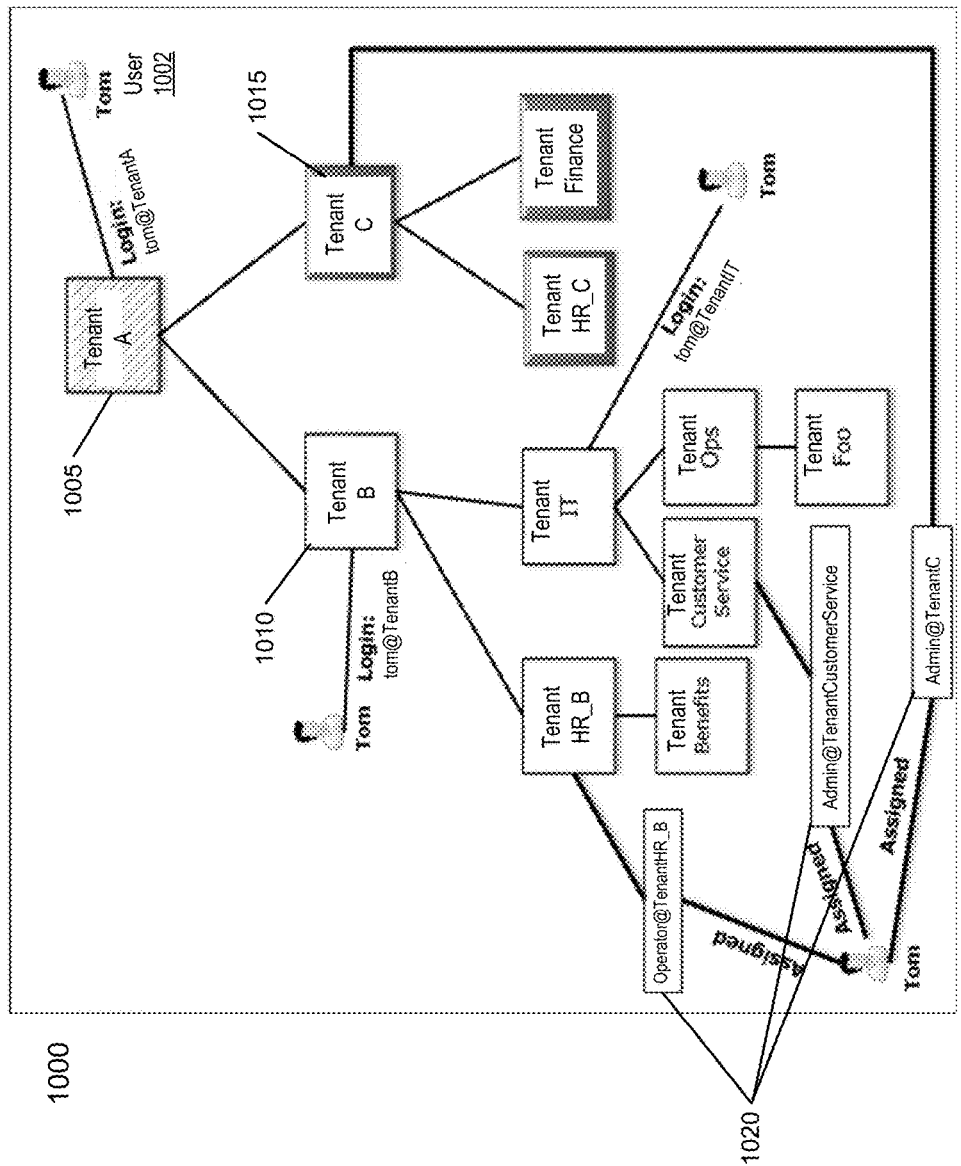
FIGS. 10A and 10B are block diagrams illustrating a revocation system in a multi-tenant environment, according to certain embodiments of the invention.
Figure 10B:
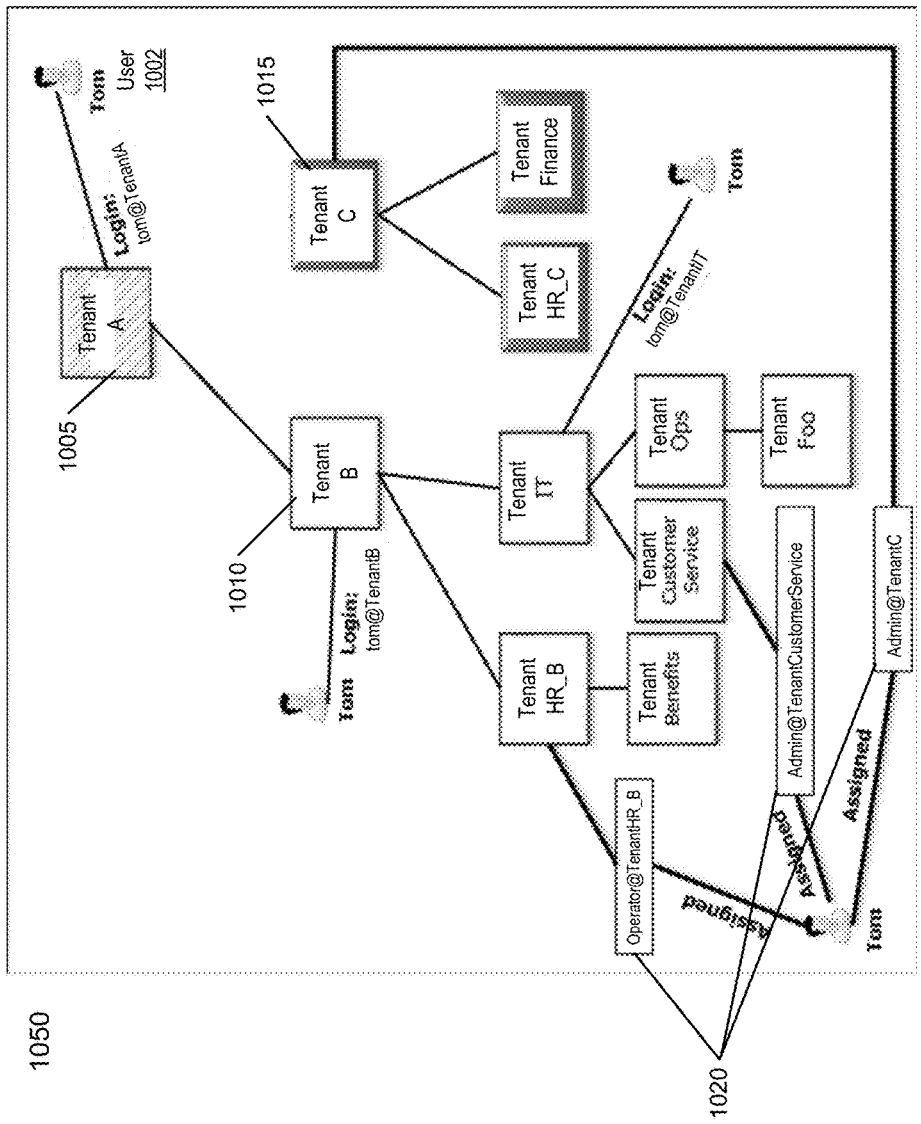

FIGS. 10A and 10B are block diagrams illustrating a revocation system in a multi-tenant environment, according to certain embodiments of the invention. FIGS. 10A-B illustrate an example for managing access control of users in a multi-tenant environment, such as revoking a parent-tenant from accessing a child-tenant. Such a revocation process may be performed by configuration module 420 in response to a revocation request received via user interface 410 of FIG. 4 from a user or administrator. Alternatively, the revocation process may be performed by a tenant manager managing the tenant objects of the tenants, in response to a command received from configuration module 420. Referring to FIG. 10A, tenant tree 1000 is a hierarchical tree logically representing relationships amongst tenants, which some of the tenants may be child tenants of a parent tenant. Each of tenants of tenant tree 1000 as shown in FIG. 10A is represented by a tenant object, such as tenant object 520 of FIG. 5 as described above.

As described above, a child tenant includes a parent tenant property storing a parent tenant ID that identifies another tenant object representing a parent tenant. For example, a tenant object corresponding to tenant 1010 includes a parent tenant property or attribute storing a tenant ID identifying its parent tenant, in this example, tenant 1005. Similarly, a tenant object corresponding tenant HR_B includes a parent tenant property or attribute storing a tenant ID identifying its parent tenant, in this example, tenant 1010, and so on. Based on the tenant hierarchical tree 1000, by default, a user associated with a parent tenant can automatically access resources of a child tenant.

In one embodiment, system 1000 includes user 1002 (e.g., Tom), one or more tenants, and roles 1020 assigned to user 1002. The one or more tenants include Tenant A 1005, Tenant B 1010 (also referred to as TenantA/TenantB), Tenant C 1015 (also referred to as TenantA/TenantC), and one or more child-tenants (e.g., Tenant HR_B, Tenant HR_C, Tenant IT, etc.). For example, user 1002 is only assigned roles 1020, which are associated with one or more tenants. For example, roles 1020 include only the following three roles: 1) Operator@TenantA/TenantB/TenantHR_B (also referred to as Operator@TenantHR_B), 2) Admin@TenantA/TenantB/TenantIT/TenantCustomerService (also referred to as Admin@TenantCustomerService), and 3) Admin@TenantA/TenantC (also referred to as Admin@TenantC). Continuing on with the above example, each tenant of system 1000 is associated with the same identity provider (e.g., identity provider server 170), which allows user 1002 to log into each illustrated tenant by specifying the specific tenant name during the log in request (i.e., the authentication request). In response to a valid authentication request, user 1002 is authorized to possess certain roles, and the roles are generated based on the specific tenant that was identified/named during authentication.

According to one embodiment, user 1002 logs into Tenant B 1010 (also referred to as TenantA/TenantB) and is then successfully authenticated. At Tenant B 1010, user 1002 is now authorized the following roles: Operator@ TenantA/TenantB/TenantHR_B and Admin@TenantA/TenantB/TenantIT/TenantCustumerService. Continuing on with the above example, user 1002 is authenticated/authorized within Tenant B 1010 and is authorized two roles (i.e., user 1002 is not authorized Admin@TenantA/TenantC role). However, user 1002 is not authorized roles associated with Tenant C 1015, Tenant C's hierarchy, or Tenant A 1005, even if the roles are assigned to user 1002. Further, in order to possess the roles assigned in these tenants, user 1002 must log into Tenant C 1015 and/or Tenant A 1005.

In one embodiment, user 1002 logs into Tenant IT (also referred to as TenantA/TenantB/TenantIT) and is then successfully authenticated. At Tenant IT, user 1002 is now authorized the following role: Admin@TenantA/TenantB/TenantIT/TenantCustumerService. Continuing on with the above example, user 1002 is authenticated/authorized within Tenant IT and is authorized one role (i.e., Admin role within Tenant IT and Tenant Customer Service), which is associated with Tenant IT's child-tenant Tenant Customer Service. However, user 1002 is not authorized roles associated with Tenant B 1010, Tenant A 1005, or Tenant C 1015, even if the roles are assigned to user 1002. According to one embodiment, user 1002 logs into Tenant A 1005 (e.g., service provider) and is then successfully authenticated. At Tenant A 1005, user 1002 is now authorized to all three roles: 1) Operator@TenantA/TenantB/TenantHR_B, 2) Admin@TenantA/TenantB/TenantIT/TenantCustomerService, and 3) Admin@TenantA/TenantC.

In one embodiment, configuration module 420 of auth server 180 receives a request from user 1002 to revoke an access right of users within Tenant A 1005 for accessing Tenant C 1015, wherein Tenant A 1005 is a parent tenant of Tenant C 1015. In response to the request, auth server 180 determines a role of user 1002 within Tenant C 1015. Further, configuration module 420 determines whether an access privilege of the role of user 1002 allows user 1002 to revoke the access right to Tenant C 1015. The determination process is similar to the token process as described above with respect to FIG. 5. In response to determining that user 1002 is assigned a revoke privilege, configuration module 420 allows user 1002 to remove Tenant C 1015 from Tenant A 1005, such that users of Tenant A 1005 are no longer authorized to access resources of Tenant C 1015 from Tenant A 1005. In one embodiment, in this example, configuration module 420 modifies the parent tenant property of the tenant object corresponding to tenant 1015 to remove the parent tenant ID of tenant 1005, as a result, tenant 1015 is no longer a child tenant to tenant 1005, as shown in FIG. 10B.

Referring now to FIG. 10B, system 1050 illustrates an example of the multi-tenant environment after a tenant (e.g., Tenant A 1005) has been revoked. In one embodiment, Tenant C 1015 determines to revoke Tenant A 1005 (i.e., to detach a parent-tenant association with Tenant A 1005). In response to determining to revoke Tenant A 1005, user 1002, who is authorized within Tenant C 1015 and Tenant A 1005, initiates a revocation operation to remove Tenant A 1005 from Tenant C 1015. In order to initiate the revocation operation, a principal/user must be associated with both tenants, which are being detached. Continuing on with the above example, if user 1002 is logged in to Tenant A 1005, the revocation operation provides that user 1002 no longer has any roles associated to Tenant C 1015 and is no longer authorized any roles/privileges associated with Tenant C 1015. Further, Tenant C 1015 is no longer the child-tenant of Tenant A 1005 and is no longer associated within Tenant A's tree hierarchy.

According to one embodiment, user 1002, who is logged in to Tenant A 1005, is then authorized the following roles: Operator@TenantA/TenantB/TenantHR_B and Admin@TenantA/TenantB/TenantIT/TenantCustumerService. However, user 1002 is not authorized any roles/privileges associated with Tenant C 1015 (e.g., Admin@TenantC) or within Tenant C's hierarchy, while user 1002 is logged in to Tenant A 1005. Note that in some embodiments, Tenant C 1005 is still associated with the same identity provider (e.g., identity provider server 170) as Tenant A 1005 through domains. For example, user 1002 may log in to Tenant C 1005 and may be authorized the role of Admin@TenantC. According to one embodiment, in order to completely revoke the authentication/authorization of user 1002 to access Tenant C 1015, the domain associating the identity provider to Tenant C 1015 has to be removed.

Figure 11:
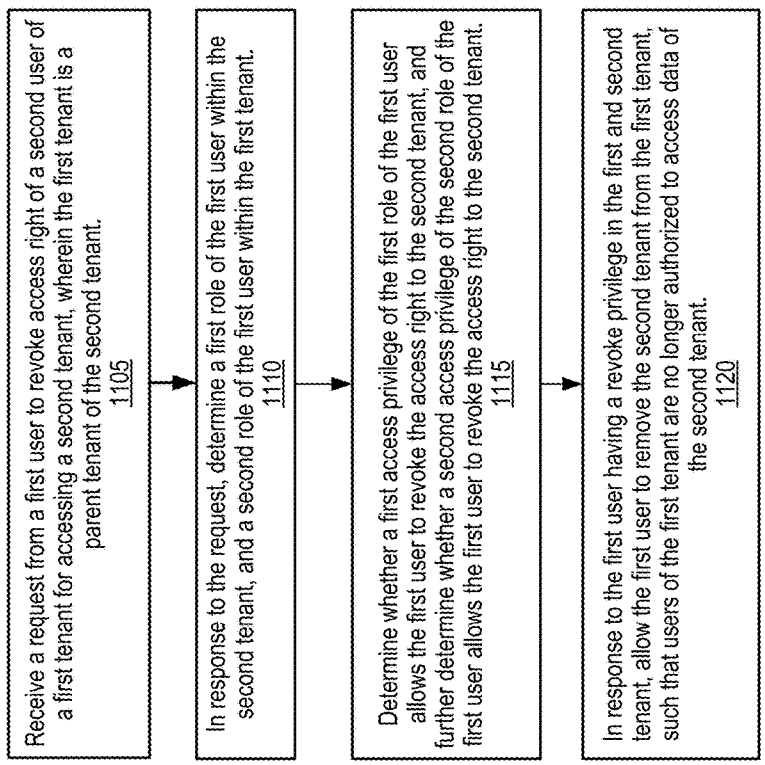
FIG. 11 is a flow diagram illustrating a method for managing access control of users in a multi-tenant environment according to one embodiment of the invention.

FIG. 11 is a flow diagram illustrating a method for managing access control of users in a multi-tenant environment according to one embodiment of the invention. For example, method 1100 can be performed by auth server 180. Method 1100 can be implemented in software, firmware, hardware, or any combination thereof. Referring now to FIG. 11, at block 1105, an authentication/authorization server receives a request from a first user to revoke access right of a second user of a first tenant for accessing a second tenant, wherein the first tenant is a parent tenant of the second tenant. At block 1110, in response to the request, an authentication/authorization server determines a role of the first user within the second tenant. At block 1115, an authentication/authorization server determines whether an access privilege of the role of the first user allows the first user to revoke the access right to the second tenant. At block 1120, in response to the first user having a revoke privilege, an authentication/authorization server allows the first user to remove the second tenant from the first tenant, such that users of the first tenant are no longer authorized to access data of the second tenant from the first tenant.

Figure 12:
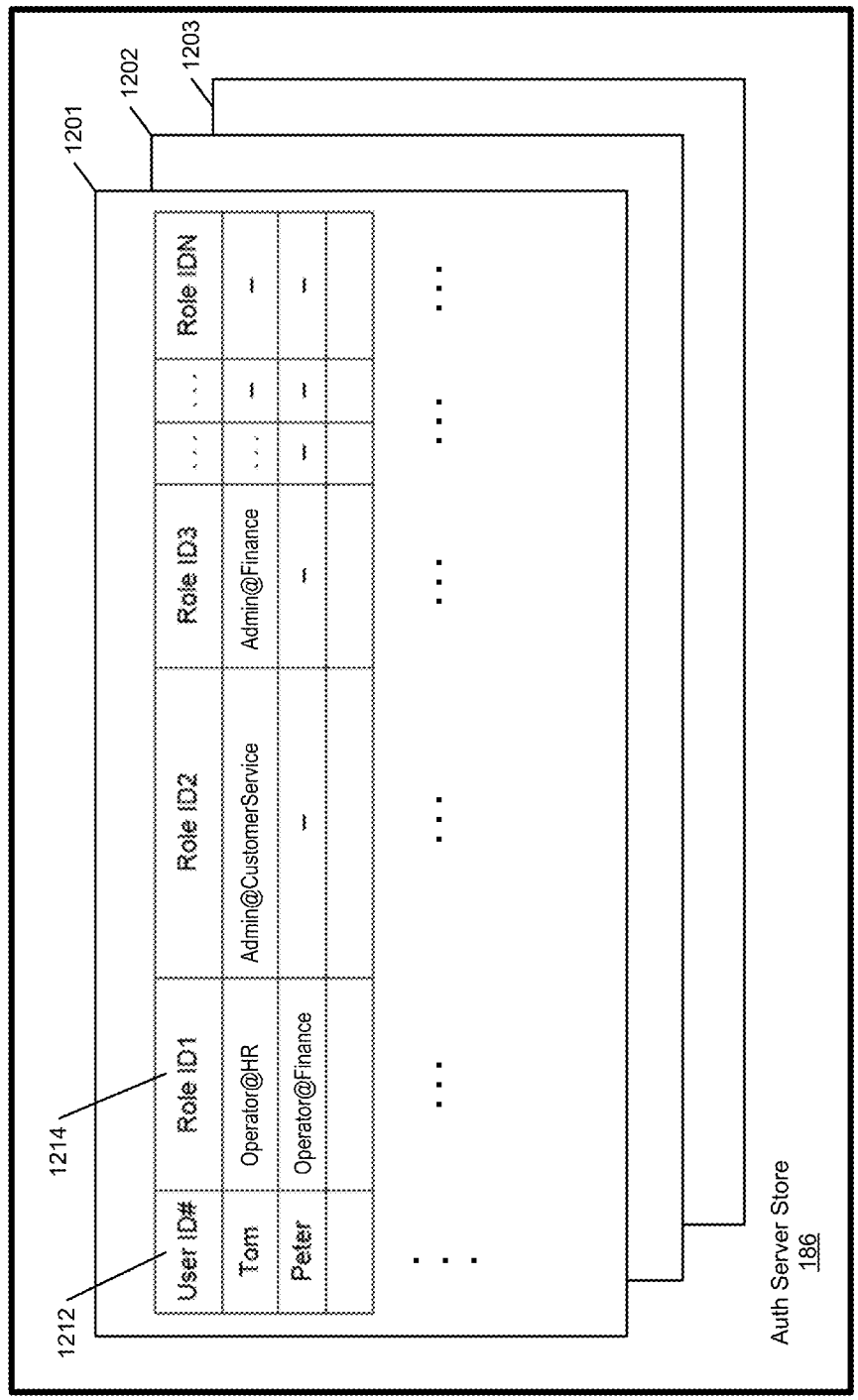
FIG. 12 is a block diagram illustrating an example of an authentication/authorization store in which users are associated with multiple roles according to one embodiment of the invention.

FIG. 12 is a block diagram illustrating an example of an auth server store in which users are associated with multiple roles according to one embodiment of the invention. FIG. 12 illustrates an example of auth server store 186 that includes, but is not limited to, one or more tenants 1201-1203. Each tenant (e.g., Tenant 1201) is associated with a list that illustrates user IDs 1212 and role IDs 1214. The illustrated block diagram is a table, but another block diagram may work equally well, such as a list, a map, and a rational database. FIG. 12 shall be described with reference to the examples illustrated in FIG. 1 and FIGS. 4-5.

In this example as shown in FIG. 12, auth server 186 includes one or more tenants 1201-1203, and each tenant provides a list of user IDs 1212 that are associated with one or more role IDs 1214. In one embodiment, at tenant 1201, the table contains a list of user IDs 1212 and one or more role IDs 1214 to be utilized by a component (e.g., a client) to determine whether a user is assigned a particular role, which is required to access a particular resource at Tenant 1201. For example, Tom, who is an authenticated user within Tenant 1201, is assigned/authorized three roles (e.g., Operator@HR, Admin@Customerservice, Admin@Finance), while Peter is only assigned/authorized one role (e.g., Operator@Finance) within Tenant 1201. Continuing on with the above example, if Peter requests access to an HR resource, a component (e.g., client) will then deny Peter's requests when the component compares Peter's auth token with the component's RBAC, which requires an HR role to assess the HR resource within Tenant 1201.

In one embodiment, auth server store 186 may be implemented in an authentication/authorization system such as auth server 180 or any component which may perform authentication/authorization within a multi-tenant environment. It should be understood that a user (e.g., Tom) may be associated with multiple tenants (e.g. tenants 1201-1203), which authorizes the user to have multiple roles within multiple tenants. Of course, the block diagram for illustrating an example of auth server store may include additional and/or different parameters.

Figure 13:
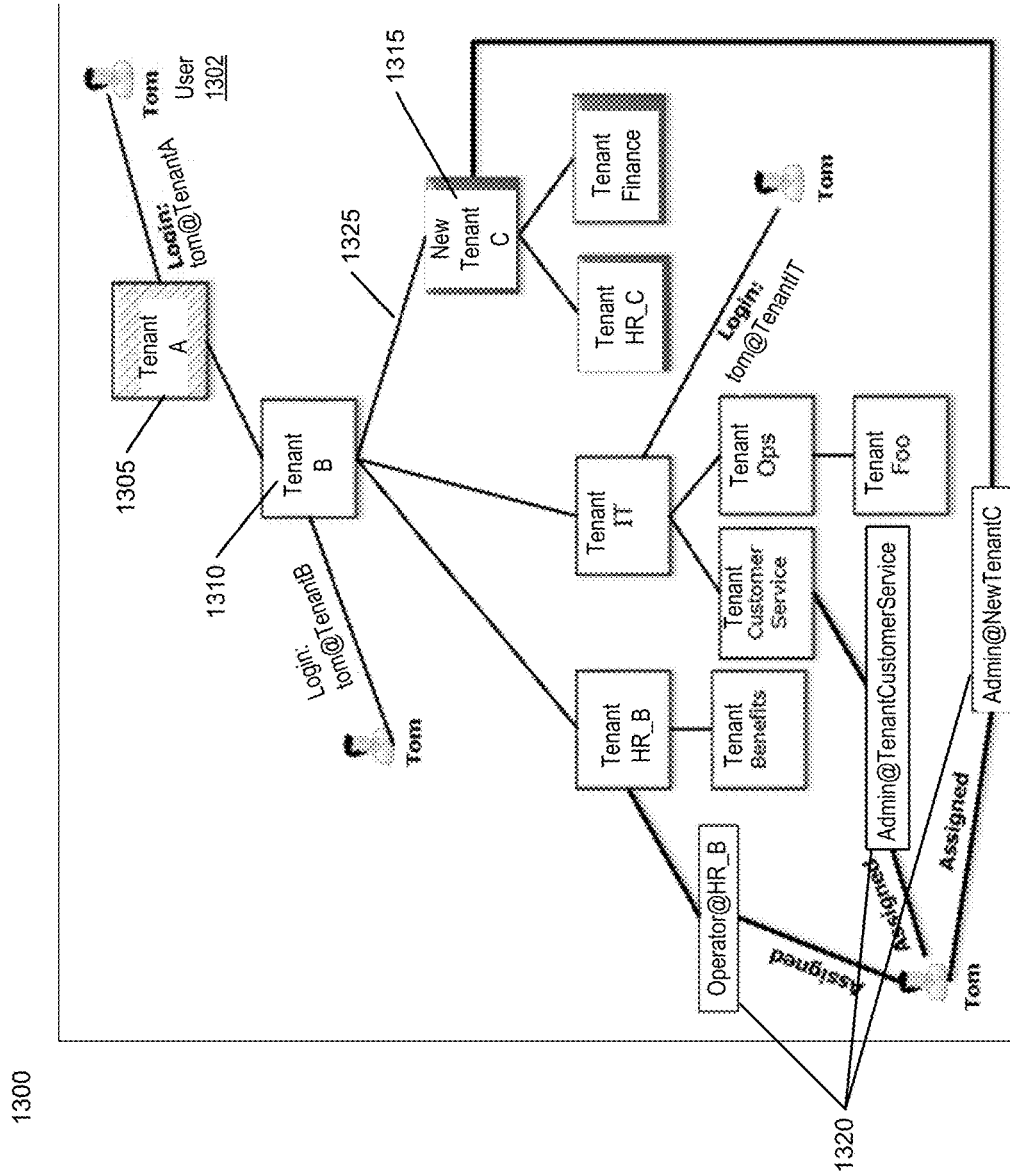
FIG. 13 is a block diagram illustrating a reorganization system in a multi-tenant environment according to one embodiment of the invention.

FIG. 13 is a block diagram illustrating an example of a reorganization system in a multi-tenant environment according to one embodiment of the invention. FIG. 13 illustrates an example for managing access control of users in a multi-tenant environment, such as realigning a tree hierarchy from a first tenant to a second tenant. Such a realigning process may be performed by configuration module 420 in response to a revocation request received via user interface 410 of FIG. 4 from a user or administrator. Alternatively, the realigning process may be performed by a tenant manager managing the tenant objects of the tenants, in response to a command received from configuration module 420. FIG. 13 shall be described with reference to the system illustrated in FIGS. 10A-B. That is, the illustrated user (e.g., Tom) and tenants of FIG. 13 are similar to the user and tenants of FIG. 10A-B.

Referring now to FIG. 13, system 1300 includes user 1302 (e.g., Tom), one or more tenants, and roles 1320 assigned to user 1302. The one or more tenants include Tenant A 1305, Tenant B 1310 (also referred to as TenantA/TenantB), New Tenant C 1315, and one or more child-tenants (e.g., Tenant HR_B, Tenant HR_C, Tenant IT, etc.). For example, user 1302 is only assigned roles 1320, which are associated with one or more tenants. Continuing on with the above example, each tenant of system 1300 is associated with the same identity provider (e.g., identity provider server 170) through domains, which allows user 1302 to log into each illustrated tenant by specifying the specific tenant and domain names during the login process (i.e., the authentication request).

In one embodiment, system 1300 illustrates an example of the multi-tenant environment after realigning a tree hierarchy of New Tenant C 1315 (i.e., Tenant C 1015 after realignment) from Tenant A 1305 to Tenant B 1310. By way of example, assume Tenant B 1310 has acquired/purchased Tenant C 1015 (referenced in FIG. 10A) or a service provider (e.g., Tenant A 1305) decided to reorganize tenants/customers in the multi-tenant environment, and following the acquisition or reorganization tenants named the new sub-organization as New Tenant C 1315. Continuing on with the above example, Tenant B 1310 has instantiated a reorganization operation for New Tenant C 1315 (also referred to as TenantA/TenantB/NewTenantC) based on the original Tenant C 1015 (also referred to as TenantA/TenantC) referenced in FIG. 10A.

In one embodiment, the reorganization operation provides user 1302, who is logged in and authenticated at Tenant A 1305, to have each role 1320 that user 1302 previously had under Tenant C 1015, which is now New Tenant C 1315. Note that because the New Tenant C 1315 resides in Tenant A's subtree, user 1302 is now authorized the following three roles 1320: 1) Operator@TenantA/TenantB/TenantHR_B, 2) Admin@TenantA/TenantB/TenantIT/TenantCustomerService, and 3) Admin@TenantA/TenantB/NewTenantC. Note that after the reorganization operation Admin@TenantA/TenantC role (referenced in FIG. 10A) changed to Admin@TenantA/TenantB/NewTenantC role.

In one embodiment, a user is required to have an auth token assigned with a "realign" privilege in both tenants that are being realigned. In one embodiment, a user may be required to have an auth token assigned with a dedicated service provider "master" privilege in order to realign a tenant tree hierarchy. By way of example, once a child-tenant establishes its tree hierarchy by referencing the child-tenant to a particular/new parent-tenant, a user authenticated in the new parent-tenant may have roles authorizing the user within the child-tenant and the child-tenant's sub tree.

According to one embodiment, in order to realign tenant 1315 from tenant 1305 to tenant 1310, assuming the requesting user is authorized, configuration module 420 may modify the parent tenant property of the tenant object corresponding to tenant 1315 from a first parent tenant ID of tenant 1305 to a second parent tenant ID of tenant 1310. By removing the first parent tenant ID of tenant 1305 from its parent tenant property, tenant 1315 is no longer a child tenant of tenant 1305. By adding the second parent tenant ID of tenant 1310 to its parent tenant property, tenant 1315 becomes a child tenant of tenant 1310.

Figure 14:
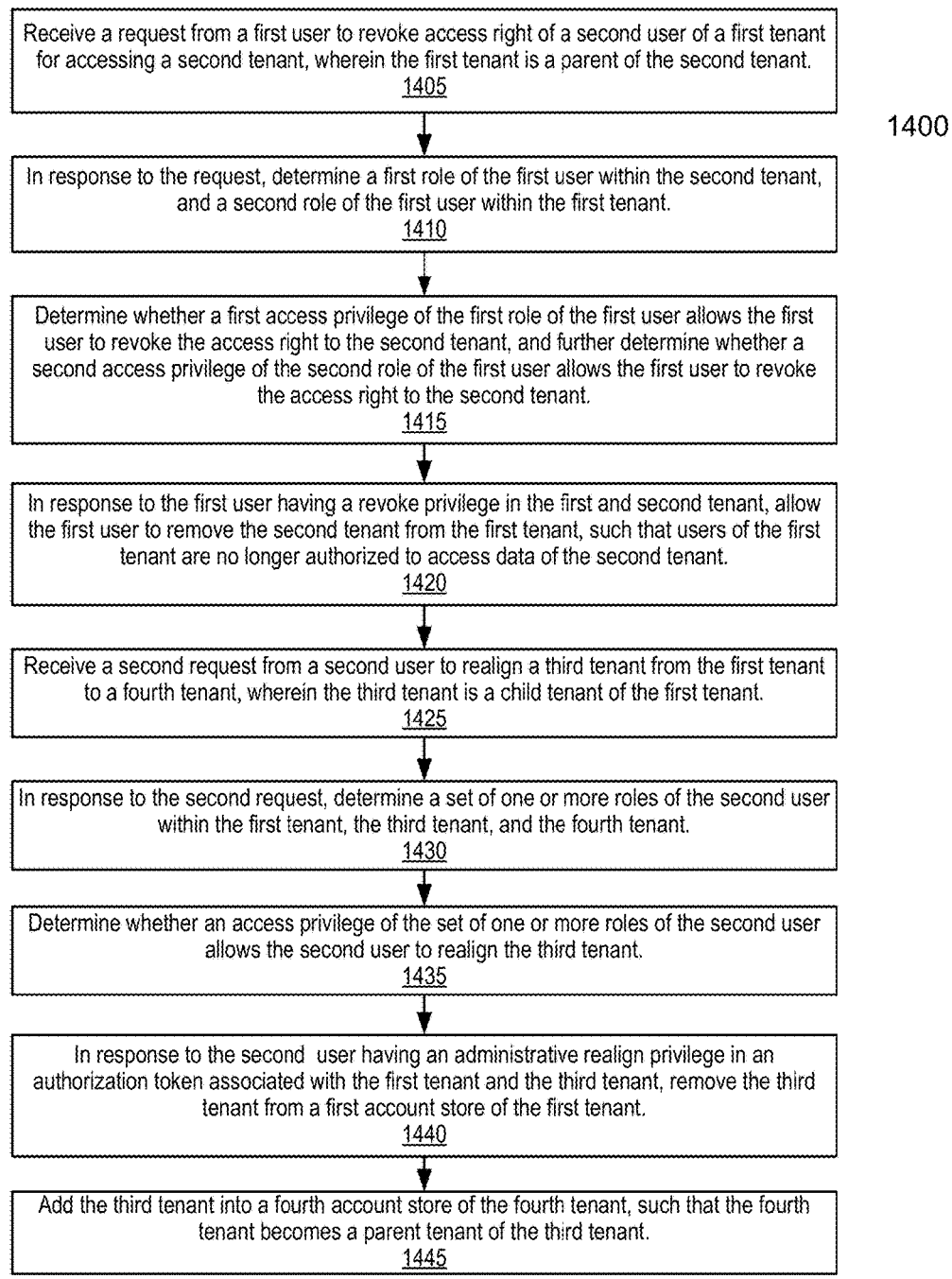
FIG. 14 is a flow diagram illustrating a method for realigning tenants and managing access control of users in a multi-tenant environment according to one embodiment of the invention.

FIG. 14 is a flow diagram illustrating a method for realigning tenants and managing access control of users in a multi-tenant environment according to one embodiment of the invention. For example, method 1400 can be performed by auth server 180, such as configuration module 420 of FIG. 4. Method 1400 can be implemented in software, firmware, hardware, or any combination thereof. Referring now to FIG. 14, at block 1405, an authentication/authorization server receives a request from a first user to revoke access right of a second user of a first tenant for accessing a second tenant, wherein the first tenant is a parent tenant of the second tenant. At block 1410, in response to the request, an authentication/authorization server determines a role of the first user within the second tenant. At block 1415, an authentication/authorization server determines whether an access privilege of the role of the first user allows the first user to revoke the access right to the second tenant. At block 1420, in response to the first user having a revoke privilege, an authentication/authorization server modifies an identity source of the first tenant to remove the second tenant, such that users of the first tenant are no longer authorized to access data of the second tenant from the first tenant. At block 1425, an authentication/authorization server receives a second request from a second user to realign a third tenant from the first tenant to the fourth tenant, wherein the third tenant is a child tenant of the first tenant. At block 1430, in response to the second request, an authentication/authorization server determines a second role of the second user within the first tenant. At block 1435, an authentication/authorization server determines whether an access privilege of the second role of the second user allows the second user to realign the third tenant. At block 1440, in response to the second user having a realign privilege, an authentication/authorization server removes the third tenant from the identity source of the first tenant. At block 1445, an authentication/authorization server adds the third tenant into an identity source of the fourth tenant, such that the fourth tenant becomes a parent tenant of the third tenant.

Figure 15B:
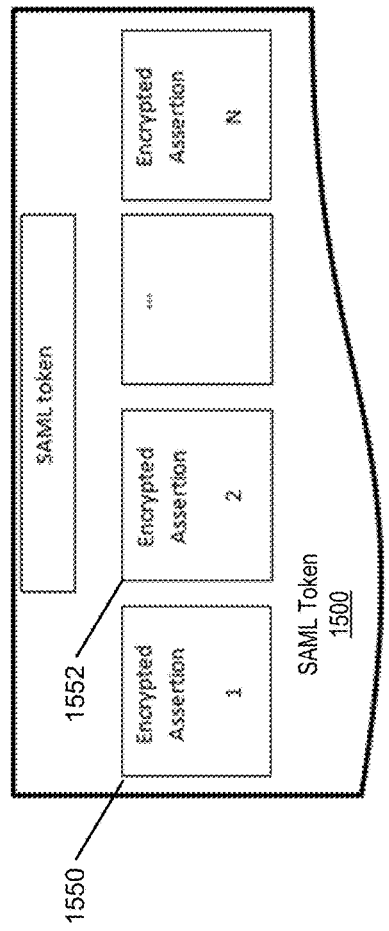
FIGS. 15A and 15B are block diagrams illustrating examples of an auth token according to certain embodiments of the invention.
Figure 15A:
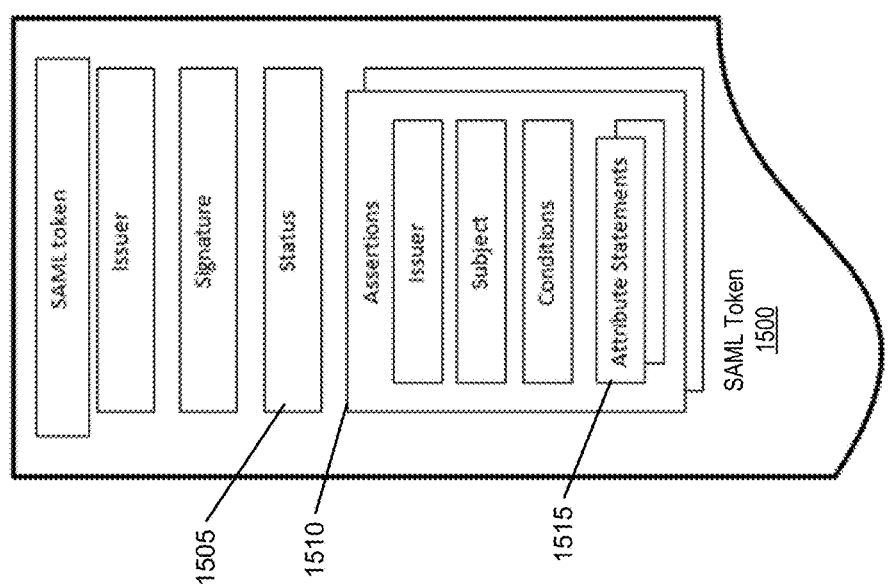

FIGS. 15A and 15B are block diagrams illustrating examples of an auth token according to certain embodiments of the invention. FIGS. 15A-B illustrate an example for authenticating and authorizing users in a multi-tenant environment by providing users with tokens such as Security Assertion Markup Language (SAML) tokens, which can be passed from one component to another. For the purpose of illustration, an SAML token is utilized as an example of an auth token. However, other types of tokens or data structures can also be utilized. Here, an "SAML token" refers to an Extensible Markup Language (XML) based, open-standard data format for exchanging authentication/authorization information about principals/users between clients, tenants, resources, and components. SAML token 1500 illustrated in FIGS. 15A-B reference the systems illustrated in FIG. 1 and FIG. 2. Certain details, however, have been omitted in FIGS. 15A-B in order to avoid obscuring the invention. Further, certain details have been added in FIGS. 15A-B in order to better illustrate the present invention. FIGS. 15A-B shall be described with reference to the system illustrated in FIGS. 1-2. That is, for example, the SAML token of FIG. 15A-B is similar to the authentication/auth token of FIG. 2.

Referring now to FIGS. 15A-B, SAML token 1500 is a container of one or more elements. In one embodiment, SAML token 1500 includes, but is not limited to assertions 1510, an issuer (e.g., the component who issued the token, in this example, auth server 180), a signature (e.g., the unique and exclusive signature of the authenticating/authorizing component), and status 1505. Status 1505 may refer to the condition of the token such as authenticated, valid, expired, and/or revoked. In one embodiment, each assertion 1510 includes, but is not limited to, an issuer, a subject, one or more conditions, and one or more attribute statements 1515. Each assertion contains statements which an authorized component may interpret as, for example, assertion 1 1550 was issued at time T by issuer R regarding subject S provided conditions C are valid. By way of example, the following XML slice presents an SAML assertion statement structure:

```
<Assertion>
   <Issuer> . . . </Issuer>
   <Signature> . . . </Signature>
   <Subject> . . . </Subject>
   <Conditions> . . . </Conditions>
   <AttributeStatement>
      <Attribute> . . . </Attribute>
      . . .
      <Attribute> . . . </Attribute>
   </AttributeStatement>
</Assertion>.
```

In one embodiment, attribute statements 1515 include, but is not limited to, the roles and privileges a user is authorized to within a particular tenant. Referring now to FIG. 15B, a principal/user may have access to one or more different tenants. If the user is successfully authenticated by auth server 180 (not shown), the user receives SAML token 1500. SAML token 1500 may be passed to different software components which serve the same or different tenants. In one embodiment, a software component may need to extract information of the user based on details in the token. According to one embodiment, in order to provide security and isolation, information of the user (e.g., attribute statements 1515) is encrypted and encapsulated into one or more encrypted assertions (e.g., encrypted assertions 1550 and 1552 as encrypted information blocks), which are stored as encrypted assertions in the SAML token (e.g., SAML token 1500). SAML token 1500 may have one or more encrypted assertions such as encrypted assertion 1 1550, encrypted assertion 2 1552, and encrypted assertion N. Further, each assertion is encrypted with a public key of a key pair that belongs to a target component/tenant, which provides that only the authorized component/tenant may decrypt and access the information of the user with a corresponding private key of the key pair maintained by the authorized component/tenant.

SAML token 1500 may be configured in authentication/authorization system such as auth server 180. It should be understood that a user may be associated with multiple assertions which authorizes the user to have multiple roles within multiple/different tenants, and each tenant is required to have the corresponding private key to decrypt and access the corresponding assertion associated with that tenant. Of course, the block diagram for illustrating an example of an SAML token may include additional and/or different parameters.

Figure 16:
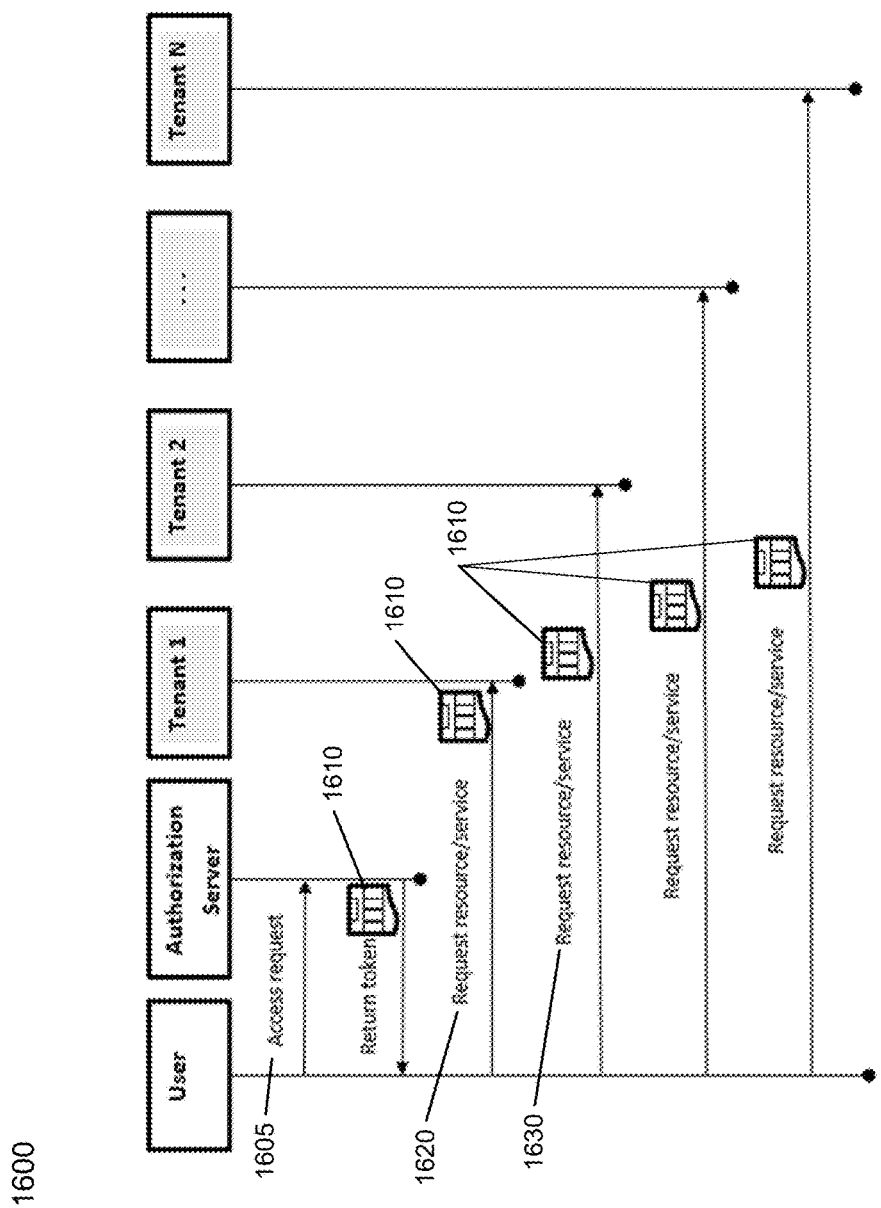
FIG. 16 is a block diagram illustrating an authentication/authorization system in which an auth token of a user is deployed in a multi-tenant environment according to one embodiment of the invention.

FIG. 16 is a block diagram illustrating an authentication/authorization system in which an auth token of a user is deployed in a multi-tenant environment according to one embodiment of the invention. FIG. 16 illustrates an example of an auth token such as an SAML token distributed in a multi-tenant environment. System 1600 illustrated in FIG. 16 references the system illustrated in FIG. 1 and FIG. 2. Certain details, however, have been omitted in FIG. 16 in order to avoid obscuring the invention. Further, certain details have been added in FIG. 16 in order to better illustrate the present invention. FIG. 16 shall be described with reference to the system illustrated in FIGS. 1-2. That is, the illustrated user, authorization server, and tenants of FIG. 16 are similar to user 101, auth server 180, and tenants 162-163 of FIG. 1.

Referring now to FIG. 16, system 1600 includes, but is not limited to, a user access request, authorization server transmitting token 1610, and the user requesting one or more resources/services from one or more tenants. System 1600 illustrates an SAML token 1610 and its usage in multi-tenant environment. In one embodiment, SAML token 1610, for example, is obtained from auth server 180. Further, SAML token 1610 has several encrypted assertions, and each encrypted assertion corresponds to a particular tenant that maintains the private key required to decrypt and access the encrypted assertion, which may be managed by the same or different components or servers. Each assertion is encrypted with a corresponding public key associated with an authorized tenant, which maintains the private key.

According to one embodiment, the user requests a resource or service from a component associated with Tenant 1. By way of example, the component from Tenant 1 can access the corresponding encrypted assertion, which includes the public key, only if the component associated with Tenant 1 has a corresponding private key. Continuing on with the example, after the component associated with Tenant 1 decrypts and accesses the encrypted information, the component of Tenant 1 determines whether the user has the required role within Tenant 1 to access the resource/service (e.g., RBAC). If so, the component of Tenant 1 allows the user access to the requested resource/service. In one embodiment, if the user has an additional request for a second resource/service (e.g., tenant 2 to tenant N which may be handled by the same or different components), the user requests the second resource/service attached with token 1610, and system 1600 repeats the same RBAC procedure for each resource/service request for a new tenant/component.

SAML token 1610 may be configured in authentication/authorization system such as auth server 180. It should be understood that system 1600 can be implemented by system 100 of FIG. 1. It should be understood that a user may be associated with multiple assertions which authorizes the user to have multiple roles within multiple/different tenants, and each component/tenant is required to have the corresponding private key to decrypt and access the corresponding assertion associated with that tenant. Of course, the block diagram for illustrating an example of an SAML token may include additional and/or different parameters.

SAML token 1500 may be configured in authentication/authorization system such as auth server 180. It should be understood that a user may be associated with multiple assertions which authorizes the user to have multiple roles within multiple/different tenants, and each tenant is required to have the corresponding private key to decrypt and access the corresponding assertion associated with that tenant. Of course, the block diagram for illustrating an example of an SAML token may include additional and/or different parameters.

FIG. 17 is a block diagram illustrating a key store according to one embodiment of the invention. For example, key store 475 can be implemented by auth server 180. FIG. 17 illustrates an example of a key store 475 that includes, but is not limited to, a list of tenants IDs 1710 associated with a list of keys 1720, respectively. Each tenant (e.g., Tenant 1) is associated with a specific key (e.g., Key 1). The illustrated block diagram is a list, but another block diagram may work equally well, such as a table, a map, and a rational database. FIG. 17 shall be described with reference to the example illustrated in FIG. 4. Certain details, however, have been omitted in FIG. 17 in order to avoid obscuring the invention. Further, certain details have been added in FIG. 17 in order to better illustrate the present invention.

In this example as shown in FIG. 17, key store 475 includes one or more tenants (e.g., Tenants 1-3), and each tenant is associated with a key. In one embodiment, each key (e.g., Key 1) in key store is a public key of a key pair which is associated with a tenant (e.g., Tenant 1). For example, the key pair includes a corresponding private key that is associated with the tenant (e.g., Tenant 1). In one embodiment, in response to a user request targeted at a first tenant, a token manager accesses key store 475 to identify a public key that exclusively corresponds to the targeted tenant, and if the user is authenticated/authorized, an encryption module encrypts the information of a token. The token with the encrypted information is then transmitted to the targeted tenant, who then uses the corresponding private key to provide access to the user request. By way of example, each key belongs to a target tenant to provide that only the authorized tenant may access resources within the targeted tenant. It is assumed the corresponding private key has been distributed to the associated components prior to the authentization.

In one embodiment, auth server 180 encrypts a first block (e.g., an assertion) with the first key (e.g., Key 1), which is a first public key of a first key pair, associated with first tenant. By way of example, in order to allow access to the user, the client device is required to have a first private key of the first key pair to decrypt the first encrypted block. The private key would have been distributed to the client prior to the authentication and/or authorization.

In one embodiment, key store 475 may be implemented in an authentication/authorization system such as auth server 180 or any component which may perform authentication/authorization within a multi-tenant environment. It should be understood that a user may be associated with multiple keys (e.g. Keys 2-3), which allows the user to be associated with multiple tenants. Of course, the block diagram for illustrating an example of key store may include additional and/or different parameters.

Figure 18:
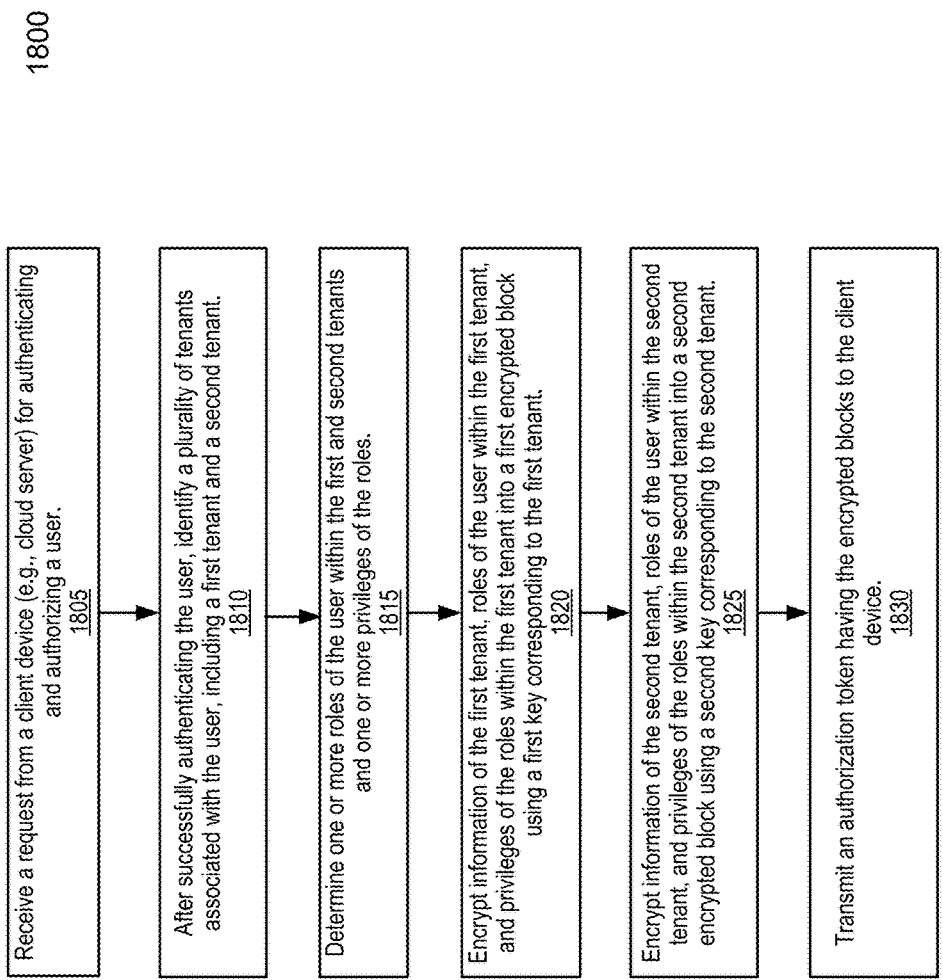
FIG. 18 is a flow diagram illustrating a method for authenticating and authorizing users in a multi-tenant environment according to one embodiment of the invention.

FIG. 18 is a flow diagram illustrating a method for authenticating and authorizing users with an auth token according to one embodiment of the invention. For example, method 1800 can be performed by auth server 180, such as token manager 430 of FIG. 4. Method 1800 can be implemented in software, firmware, hardware, or any combination thereof. Referring now to FIG. 18, at block 1805, an authentication/authorization server receives a request from a client device (e.g., cloud server) for authenticating and authorizing a user. At block 1810, after successfully authenticating the user, an authentication/authorization server identifies a plurality of tenants associated with the user, including a first tenant and a second tenant. At block 1815, an authentication/authorization server determines one or more roles of the user within the first and second tenants and one or more privileges of the roles. At block 1820, an authentication/authorization server encrypts information of the first tenant, roles of the user within the first tenant, and privileges of the roles within the first tenant into a first encrypted block using a first key corresponding to the first tenant. At block 1825, an authentication/authorization server encrypts information of the second tenant, roles of the user within the second tenant, and privileges of the roles within the second tenant into a second encrypted block using a second key corresponding to the second tenant. At block 1830, an authentication/authorization server transmits an auth token having the encrypted blocks to the client device.

Figure 19:
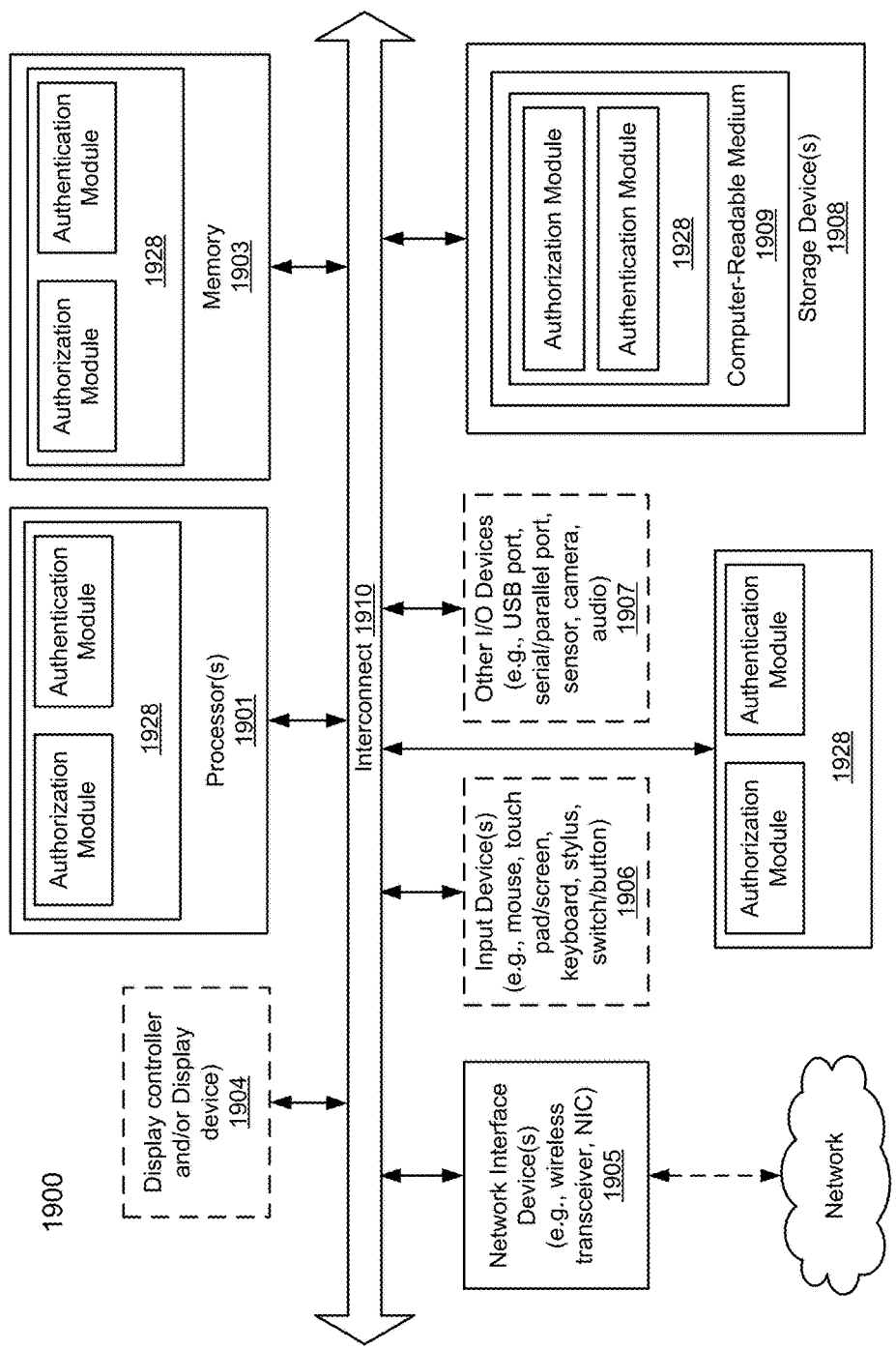
FIG. 19 is a block diagram illustrating a data processing system according to one embodiment.

FIG. 19 is a block diagram illustrating an example of a data processing system which may be used with one embodiment of the invention. For example, system 1500 may represents any of data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional components may be present in certain implementations and furthermore, different arrangement of the components shown may occur in other implementations. System 1900 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1900 includes processor 1901, memory 1903, and devices 1905-1908 via a bus or an interconnect 1910. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra-low voltage processor, may act as a main processing unit and central hub for communication with the various components of the system. Such processor can be implemented as a system on chip (SoC). Processor 1901 is configured to execute instructions for performing the operations and steps discussed herein. System 1900 may further include a graphics interface that communicates with optional graphics subsystem 1904, which may include a display controller, a graphics processor, and/or a display device.

Processor 1901 may communicate with memory 1903, which in one embodiment can be implemented via multiple memory devices to provide for a given amount of system memory. Memory 1903 may include one or more volatile storage (or memory) devices such as random access memory (RAM), dynamic RAM (DRAM), synchronous DRAM (SDRAM), static RAM (SRAM), or other types of storage devices. Memory 1903 may store information including sequences of instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including network interface device(s) 1905, optional input device(s) 1906, and other optional IO device(s) 1907. Network interface device 1905 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1907 may include an audio device. An audio device may include a speaker and/or a microphone to facilitate voice-enabled functions, such as voice recognition, voice replication, digital recording, and/or telephony functions. Other IO devices 1907 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1907 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1910 via a sensor hub (not shown), while other devices such as a keyboard or thermal sensor may be controlled by an embedded controller (not shown), dependent upon the specific configuration or design of system 1900.

To provide for persistent storage of information such as data, resources, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Storage device 1908 may include computer-accessible storage medium 1909 (also known as a machine-readable storage medium or a computer-readable medium) on which is stored one or more sets of instructions or software (e.g., authorization/authentication module, module, unit, and/or logic 1928) embodying any one or more of the methodologies or functions described herein. Authentication and authorization module/unit/logic 1928 may also reside, completely or at least partially, within memory 1903 and/or within processor 1901 during execution thereof by data processing system 1900, memory 1903 and processor 1901 also constituting machine-accessible storage media. Authentication and authorization module/unit/logic 1928 may further be transmitted or received over a network via network interface device 1905.

Computer-readable storage medium 1909 may also be used to store the some software functionalities described above persistently. While computer-readable storage medium 1909 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Authentication and authorization module/unit/logic 1928, components and other features described herein can be implemented as discrete hardware components or integrated in the functionality of hardware components such as ASICS, FPGAs, DSPs or similar devices. In addition, authentication and authorization module/unit/logic 1928 can be implemented as firmware or functional circuitry within hardware devices. Further, authentication and authorization module/unit/logic 1928 can be implemented in any combination hardware devices and software components.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing access control of users in a multi-tenant environment, the method comprising:
   receiving a first request from a first user to revoke an access right of a second user of a first tenant for accessing data of a second tenant, wherein the first tenant is a parent tenant of the second tenant;
   in response to the first request, determining a first role of the first user within the second tenant, and a second role of the first user within the first tenant; determining whether a first access privilege of the first role of the first user allows the first user to revoke the access right to the second tenant;
   determining whether a second access privilege of the second role of the first user allows the first user to revoke the access right to the second tenant;
   in response to the first user having a revoke privilege in the first and second tenant, allowing the first user to remove the second tenant from the first tenant;
   receiving a second request from the second user to realign a third tenant from the first tenant to a fourth tenant, wherein the third tenant is a child tenant of the first tenant;
   in response to the second request, determining a set of one or more roles of the second user within the first tenant, the third tenant, and the fourth tenant; and
   realigning the third tenant from the first tenant to the fourth tenant in response to determining an access privilege of the set of one or more roles of the second user allows the second user to realign the third tenant, wherein the access privilege includes an administrative realign privilege.

2. The method of claim 1, wherein after the second tenant has been removed from the first tenant, each user of the first tenant is no longer authorized to access data of the second tenant.

3. The method of claim 1, wherein realigning the third tenant from the first tenant to the fourth tenant comprises:
   removing the third tenant from a first account store of the first tenant; and
   adding the third tenant into a fourth account store of the fourth tenant, such that the fourth tenant becomes a parent tenant of the third tenant, wherein the administrative realign privilege is from an authorization token associated with the first tenant and the third tenant.

4. The method of claim 3, further comprising:
   determining a third role of the second user associated with the fourth tenant; and
   determining whether an access privilege of the third role of the second user associated with the fourth tenant allows the second user to add the third tenant, wherein the third tenant is added as a child tenant of the fourth tenant only if the access privilege of the third role associated with the fourth tenant allows.

5. The method of claim 3, wherein the fourth tenant is a child tenant of the first tenant.

6. The method of claim 3, further comprising:
   receiving a third request from a third user to add a fifth tenant as a child tenant to the first tenant;
   determining a fourth role of the third user associated with the first tenant;
   determining whether an access privilege of the fourth role of the third user associated with the first tenant allows the third user to add the fifth tenant as a child tenant of the first tenant; and
   adding the fifth tenant into the first account store of the first tenant.

7. The method of claim 6, wherein after the fifth tenant has been added as a child tenant of the first tenant, data associated with the fifth tenant can be accessed by users associated with the first tenant if the users have one or more roles associated with the fifth tenant.

8. A non-transitory machine-readable medium having instructions stored therein, which when executed by a processor, cause the processor to perform operations for managing access control of users in a multi-tenant environment, the operations comprising:
   receiving a first request from a first user to revoke an access right of a second user of a first tenant for accessing data of a second tenant, wherein the first tenant is a parent tenant of the second tenant;
in response to the first request, determining a first role of the first user within the second tenant, and a second role of the first user within the first tenant;
determining whether a first access privilege of the first role of the first user allows the first user to revoke the access right to the second tenant;
determining whether a second access privilege of the second role of the first user allows the first user to revoke the access right to the second tenant;
in response to the first user having a revoke privilege in the first and second tenant, allowing the first user to remove the second tenant from the first tenant;
receiving a second request from the second user to realign a third tenant from the first tenant to a fourth tenant, wherein the third tenant is a child tenant of the first tenant;
in response to the second request, determining a set of one or more roles of the second user within the first tenant, the third tenant, and the fourth tenant; and
realigning the third tenant from the first tenant to the fourth tenant in response to determining an access privilege of the set of one or more roles of the second user allows the second user to realign the third tenant, wherein the access privilege includes an administrative realign privilege.

9. The medium of claim 8, wherein after the second tenant has been removed from the first tenant, each user of the first tenant is no longer authorized to access data of the second tenant.

10. The medium of claim 8, wherein realigning the third tenant from the first tenant to the fourth tenant comprises:
removing the third tenant from a first account store of the first tenant; and
adding the third tenant into a fourth account store of the fourth tenant, such that the fourth tenant becomes a parent tenant of the third tenant, wherein the administrative realign privilege is from an authorization token associated with the first tenant and the third tenant.

11. The medium of claim 10, further comprising:
determining a third role of the second user associated with the fourth tenant; and
determining whether an access privilege of the third role of the second user associated with the fourth tenant allows the second user to add the third tenant, wherein the third tenant is added as a child tenant of the fourth tenant only if the access privilege of the third role associated with the fourth tenant allows.

12. The medium of claim 10, wherein the fourth tenant is a child tenant of the first tenant.

13. The medium of claim 10, further comprising:
receiving a third request from a third user to add a fifth tenant as a child tenant to the first tenant;
determining a fourth role of the third user associated with the first tenant;
determining whether an access privilege of the fourth role of the third user associated with the first tenant allows the third user to add the fifth tenant as a child tenant of the first tenant; and
adding the fifth tenant into the first account store of the first tenant.

14. The medium of claim 13, wherein after the fifth tenant has been added as a child tenant of the first tenant, data associated with the fifth tenant can be accessed by users associated with the first tenant if the users have one or more roles associated with the fifth tenant.

15. A system, comprising:
a processor; and
a memory coupled to the processor for storing instructions, which when executed from the memory, cause the processor to perform operations, the operations including:
receiving a first request from a first user to revoke an access right of a second user of a first tenant for accessing data of a second tenant, wherein the first tenant is a parent tenant of the second tenant,
in response to the first request, determining a first role of the first user within the second tenant, and a second role of the first user within the first tenant,
determining whether a first access privilege of the first role of the first user allows the first user to revoke the access right to the second tenant,
determining whether a second access privilege of the second role of the first user allows the first user to revoke the access right to the second tenant, and
in response to the first user having a revoke privilege in the first and second tenant, allowing the first user to remove the second tenant from the first tenant;
receiving a second request from the second user to realign a third tenant from the first tenant to a fourth tenant, wherein the third tenant is a child tenant of the first tenant; and
in response to the second request, determining a set of one or more roles of the second user within the first tenant, the third tenant, and the fourth tenant;
realigning the third tenant from the first tenant to the fourth tenant in response to determining an access privilege of the set of one or more roles of the second user allows the second user to realign the third tenant, wherein the access privilege includes an administrative realign privilege.

16. The system of claim 15, wherein after the second tenant has been removed from the first tenant, each user of the first tenant is no longer authorized to access data of the second tenant.

17. The system of claim 15, wherein realigning the third tenant from the first tenant to the fourth tenant comprises:
removing the third tenant from a first account store of the first tenant; and
adding the third tenant into a fourth account store of the fourth tenant, such that the fourth tenant becomes a parent tenant of the third tenant, wherein the administrative realign privilege is from an authorization token associated with the first tenant and the third tenant.

18. The system of claim 17, further comprising:
determining a third role of the second user associated with the fourth tenant; and
determining whether an access privilege of the third role of the second user associated with the fourth tenant allows the second user to add the third tenant, wherein the third tenant is added as a child tenant of the fourth tenant only if the access privilege of the third role associated with the fourth tenant allows.

19. The system of claim 17, wherein the fourth tenant is a child tenant of the first tenant.

20. The system of claim 17, further comprising:
receiving a third request from a third user to add a fifth tenant as a child tenant to the first tenant;
determining a fourth role of the third user associated with the first tenant;

determining whether an access privilege of the fourth role of the third user associated with the first tenant allows the third user to add the fifth tenant as a child tenant of the first tenant; and adding the fifth tenant into the first account store of the first tenant.

21. The system of claim 20, wherein after the fifth tenant has been added as a child tenant of the first tenant, data associated with the fifth tenant can be accessed by users associated with the first tenant if the users have one or more roles associated with the fifth tenant.

* * * * *